(12) United States Patent
Wang et al.

(10) Patent No.: US 10,735,064 B2
(45) Date of Patent: Aug. 4, 2020

(54) METHOD FOR DETERMINING PRECODING MATRIX INDICATOR, USER EQUIPMENT, AND BASE STATION

(71) Applicant: HUAWEI TECHNOLOGIES CO., LTD., Shenzhen, Guangdong (CN)

(72) Inventors: Jianguo Wang, Beijing (CN); Yongxing Zhou, Beijing (CN); Yong Wu, Beijing (CN); Liang Xia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/697,789

(22) Filed: Nov. 27, 2019

(65) Prior Publication Data

US 2020/0099425 A1 Mar. 26, 2020

Related U.S. Application Data

(63) Continuation of application No. 16/233,444, filed on Dec. 27, 2018, now Pat. No. 10,523,291, which is a
(Continued)

(51) Int. Cl.
*H04B 7/04* (2017.01)
*H04B 7/0456* (2017.01)
(Continued)

(52) U.S. Cl.
CPC ......... *H04B 7/0456* (2013.01); *H04B 7/0639* (2013.01); *H04L 5/0048* (2013.01)

(58) Field of Classification Search
CPC .... H04B 7/0456; H04B 7/0639; H04L 5/0048
See application file for complete search history.

(56) References Cited

U.S. PATENT DOCUMENTS 8,391,392 B2 3/2013 Melzer et al.
8,737,507 B2 5/2014 Astely et al.
(Continued)

FOREIGN PATENT DOCUMENTS

CN 101635612 A 1/2010
CN 101686079 A 3/2010
(Continued)

OTHER PUBLICATIONS

3GPP TSG RAN WG1 Meeting #60bis, R1-102508, Rapporteur (NTT DOCOMO):Simulation Assumption for 8 Tx Codebook Design,Beijing, China, Apr. 12-16, 2010. 8 pages.
(Continued)

*Primary Examiner* — Freshteh N Aghdam

(57) ABSTRACT

A method for determining a precoding matrix indicator, user equipment, and a base station are disclosed in embodiments of the present invention. The method includes: receiving a first reference signal set sent by a base station, where the first reference signal set is associated with a user equipment-specific matrix or matrix set; selecting a precoding matrix based on the first reference signal set, where the precoding matrix is a function of the user equipment-specific matrix or matrix set; and sending a precoding matrix indicator to the base station, where the precoding matrix indicator corresponds to the selected precoding matrix. In the embodiments of the present invention, CSI feedback precision can be improved without excessively increasing feedback overhead, thereby improving system performance.

32 Claims, 4 Drawing Sheets

Related U.S. Application Data continuation of application No. 16/107,653, filed on Aug. 21, 2018, now Pat. No. 10,263,674, which is a continuation of application No. 15/950,820, filed on Apr. 11, 2018, now Pat. No. 10,141,990, which is a continuation of application No. 14/936,092, filed on Nov. 9, 2015, now Pat. No. 9,967,008, which is a continuation of application No. PCT/CN2013/075486, filed on May 10, 2013.

(51) Int. Cl.
   *H04L 5/00* (2006.01)
   *H04B 7/06* (2006.01)

(56) References Cited

U.S. PATENT DOCUMENTS

| | | | |
|---|---|---|---|
| 9,209,877 | B2 | 12/2015 | Wang et al. |
| 9,214,996 | B2 | 12/2015 | Kim et al. |
| 2009/0003466 | A1 | 1/2009 | Taherzadehboroujeni et al. |
| 2010/0045494 | A1 | 2/2010 | Clerckx et al. |
| 2010/0322343 | A1 | 12/2010 | Yeon et al. |
| 2011/0080969 | A1 | 4/2011 | Jöngren et al. |
| 2011/0110405 | A1 | 5/2011 | Lee et al. |
| 2011/0170638 | A1 | 7/2011 | Yuan et al. |
| 2011/0205930 | A1* | 8/2011 | Rahman ............... H04B 7/0417 370/252 |
| 2011/0216846 | A1 | 9/2011 | Lee et al. |
| 2011/0235743 | A1 | 9/2011 | Lee et al. |
| 2011/0249712 | A1 | 10/2011 | Hammarwall et al. |
| 2011/0268207 | A1 | 11/2011 | Choi et al. |
| 2011/0274188 | A1 | 11/2011 | Sayana et al. |
| 2012/0039402 | A1 | 2/2012 | Clerckx et al. |
| 2012/0082248 | A1 | 4/2012 | Han et al. |
| 2012/0106595 | A1 | 5/2012 | Bhattad et al. |
| 2012/0218948 | A1 | 8/2012 | Onggosanusi et al. |
| 2012/0219042 | A1 | 8/2012 | Onggosanusi et al. |
| 2012/0238039 | A1 | 9/2012 | Cha et al. |
| 2012/0269290 | A1 | 10/2012 | Onggosanusi et al. |
| 2012/0322492 | A1 | 12/2012 | Koo et al. |
| 2012/0328039 | A1* | 12/2012 | Mazzarese ............ H04B 7/063 375/267 |
| 2013/0010880 | A1 | 1/2013 | Koivisto et al. |
| 2013/0028341 | A1 | 1/2013 | Ayach et al. |
| 2013/0028344 | A1* | 1/2013 | Chen .................... H04B 7/0417 375/267 |
| 2013/0034179 | A1 | 2/2013 | Zhang et al. |
| 2013/0058305 | A1 | 3/2013 | Jang et al. |
| 2013/0058386 | A1* | 3/2013 | Mazzarese ............ H04B 7/063 375/219 |
| 2013/0058424 | A1 | 3/2013 | Enescu et al. |
| 2013/0114654 | A1 | 5/2013 | Gomadam |
| 2013/0129018 | A1 | 5/2013 | Ko et al. |
| 2013/0156125 | A1 | 6/2013 | Ko et al. |
| 2013/0163687 | A1 | 6/2013 | Jing et al. |
| 2013/0230081 | A1 | 9/2013 | Wernersson et al. |
| 2013/0259151 | A1 | 10/2013 | Thomas et al. |
| 2013/0308715 | A1 | 11/2013 | Nam et al. |
| 2013/0315328 | A1* | 11/2013 | Liu ...................... H04B 7/0413 375/267 |
| 2014/0098689 | A1 | 4/2014 | Lee et al. |
| 2014/0133595 | A1 | 5/2014 | Mazzarese et al. |
| 2014/0146778 | A1 | 5/2014 | Wang et al. |
| 2014/0177744 | A1* | 6/2014 | Krishnamurthy .... H04B 7/0469 375/267 |
| 2014/0177745 | A1 | 6/2014 | Krishnamurthy et al. |
| 2014/0192762 | A1 | 7/2014 | Li et al. |
| 2014/0226702 | A1 | 8/2014 | Onggosanusi et al. |
| 2014/0301492 | A1* | 10/2014 | Xin ...................... H04B 7/0456 375/267 |
| 2015/0012551 | A1 | 1/2015 | Dong et al. |
| 2015/0049829 | A1 | 2/2015 | Zhuang et al. |
| 2015/0244438 | A1 | 8/2015 | Ding et al. |
| 2015/0256243 | A1 | 9/2015 | Wang et al. |
| 2016/0043789 | A1 | 2/2016 | Wang et al. |
| 2017/0366241 | A1 | 12/2017 | Ko et al. |
| 2018/0097553 | A1 | 4/2018 | Wang et al. |

FOREIGN PATENT DOCUMENTS

| | | | |
|---|---|---|---|
| CN | 101771444 A | 7/2010 | |
| CN | 101969366 A | 2/2011 | |
| CN | 102075274 A | 5/2011 | |
| CN | 102082637 A | 6/2011 | |
| CN | 102111197 A | 6/2011 | |
| CN | 102122983 A | 7/2011 | |
| CN | 102130752 A | 7/2011 | |
| CN | 102273091 A | 12/2011 | |
| CN | 102299732 A | 12/2011 | |
| CN | 102299775 A | 12/2011 | |
| CN | 102714647 A | 10/2012 | |
| CN | 102835054 A | 12/2012 | |
| CN | 102870344 A | 1/2013 | |
| CN | 102932112 A | 2/2013 | |
| CN | 102938688 A | 2/2013 | |
| CN | 102959878 A | 3/2013 | |
| CN | 103039014 A | 4/2013 | |
| CN | 103560818 A | 2/2014 | |
| CN | 103782533 A | 5/2014 | |
| EP | 2557700 A2 | 2/2013 | |
| EP | 2590338 A2 | 5/2013 | |
| EP | 2755417 A1 | 7/2014 | |
| EP | 2820773 A1 | 1/2015 | |
| JP | 2012531087 A | 12/2012 | |
| JP | 2015528669 A | 9/2015 | |
| JP | 2015536099 A | 12/2015 | |
| JP | 2016532184 A | 10/2016 | |
| WO | 2009096708 A1 | 8/2009 | |
| WO | 2011082626 A1 | 7/2011 | |
| WO | 2011136627 A2 | 11/2011 | |
| WO | WO-2011136627 A2 * | 11/2011 | ........... H04B 7/0456 |
| WO | 2012002767 A2 | 1/2012 | |
| WO | 2012026742 A2 | 3/2012 | |
| WO | 2013024350 A2 | 2/2013 | |
| WO | 2013024351 A1 | 2/2013 | |
| WO | 2013034109 A1 | 3/2013 | |
| WO | 2013129985 A1 | 9/2013 | |
| WO | WO-2013129985 A1 * | 9/2013 | ........... H04B 7/0617 |
| WO | 2013185320 A1 | 12/2013 | |
| WO | 2014007591 A1 | 1/2014 | |

OTHER PUBLICATIONS

Alcatel-Lucent, Alcatel-Lucent Shanghai Bell, CQI/PMI reporting modes on PUCCH for two-stage feedback. 3GPP TSG RAN WG1 Meeting #62 Madrid, Spain, Aug. 23-27, 2010, R1-104397, 4 pages.
3GPP TS 36.211 V11.2.0 (Feb. 2013),3rd Generation Partnership Project;Technical Specification Group Radio Access Network;Evolved Universal Terrestrial Radio Access (E-UTRA);Physical Channels and Modulation(Release 11),total 109 pages.
R1-131761 Huawei et al,"WF on antenna model in 3D channel modeling",3GPP TSG RAN WG1 #72bis,Chicago, USA, Apr. 15-19, 2013,total 7 pages.
CATT, PMI/RI/CQI reporting for LTE-A. 3GPP TSG RAN WG1 Meeting #60bis Beijing, China, Apr. 12-16, 2010, R1-102056,total 4 pages.
Phillip A Regaliat et al:"Kronecker Products, Unitary Matrices and Signal Processing Applications",vol. 31, No. 4, Dec. 1989, XP055258118, Society for Industrial and Applied Mathematics, 28 pages.
Alcatel-Lucent Shanghai Bell et al:"Considerations on CSI feedback enhancements for high-priority antenna configurations",3GPP TSG RAN WG1#66 Athens, Greece, Aug. 22-26, 2011, R1-112420; Aug. 18, 2011, XP050537814, 7 pages.
Samsung, Views on the feedback framework for Rel. 10. 3GPP TSG RAN WG1 Meeting #61 Montreal, Canada, May 10-May 14, 2010, R1-103377, 17 pages.
Ericsson, Further considerations on dual layer beamforming. 3GPP TSG-Ran WG1 #57 San Francisco, USA, May 4-8, 2009, R1-092187, 5 pages.

(56) References Cited

OTHER PUBLICATIONS

Alcatel-Lucent et al., Way Forward on 8Tx Codebook for Rel.10 DL MIMO. 3GPP TSG RAN WG1 62 Madrid, Spain, Aug. 23-27, 2010, R1-105011, 6 pages.
3GPP TS 36.331 V11.3.0 3rd Generation Partnership Project;Technical Specification Group Radio Access Network; Evolved Universal Terrestrial Radio Access (E-UTRA);Radio Resource Control (RRC); Protocol specification(Release 11), Technical Specification, Mar. 2013, 343 pages.
3GPP TS 36.213 V11.2.0 3rd Generation Partnership Project;Technical Specification Group Radio Access Network; Evolved Universal Terrestrial Radio Access (E-UTRA);Physical layer procedures(Release 11), Technical Specification, Feb. 2013, 173 pages.
3GPP TS 36.211 V103.0 (Sep. 2011);3rd Generation Partnership Project;Technical Specification Group Radio Access Network;Evolved Universal Terrestrial Radio Access (E-UTRA);Physical Channels and Modulation(Release 10),total 103 pages.
3GPP TS 36.211 V10A.0 (Dec. 2011),3rd Generation Partnership Project;Technical Specification Group Radio Access Network;Evolved Universal Terrestrial Radio Access (E-UTRA);Physical Channels and Modulation(Release 10),total 101 pages.
3GPP TS 36.211 V11.3.0 (Jun. 2013);3rd Generation Partnership Project;Technical Specification Group Radio Access Network;Evolved Universal Terrestrial Radio Access (E-UTRA);Physical Channels and Modulation(Release 11),total 108 pages.
3GPP TS 36.212 V11.2.0 (Feb. 2013) ; 3rd Generation Partnership Project;Technical Specification Group Radio Access Network;Evolved Universal Terrestrial Radio Access (E-UTRA);Multiplexing and channel coding(Release 11) ; total 82 pages.
3GPP TS 36.212 V113.0 (Jun. 2013) ; 3rd Generation Partnership Project;Technical Specification Group Radio Access Network;Evolved Universal Terrestrial Radio Access (E-UTRA);Multiplexing and channel coding(Release 11), total 84 pages.
3GPP TS 36.213 V10.3.0 (Sep. 2011);3rd Generation Partnership Project;Technical Specification Group Radio Access Network;Evolved Universal Terrestrial Radio Access (E-UTRA);Physical layer procedures(Release 10),total 122 pages.
3GPP TS 36.213 V10.5.0 (Mar. 2012);3rd Generation Partnership Project;Technical Specification Group Radio Access getwork;Evolved Universal Terrestrial Radio Access (E-UTRA);Physical layer procedures(Release 10),total 125 pages.
3GPP TS 36.213 V11.2.0, 3rd Generation Partnership Project;Technical Specification Group Radio Access Network; Evolved Universal Terrestrial Radio Access (E-UTRA);Physical layer procedures(Release 11),Feb. 2013.total 173 pages.
3GPP TS 36.213 V113.0 (Jun. 2013);3rd Generation Partnership Project;Technical Specification Group Radio Access Network;Evolved Universal Terrestrial Radio Access (E-UTRA);Physical layer procedures(Release 11),total 176 pages.
3GPP TS 36.331 V10.8.0 (Dec. 2012);3rd Generation Partnership Project;Technical Specification Group Radio Access Network;Evolved Universal Terrestrial Radio Access (E-UTRA);Radio Resource Control (RRC);Protocol specification (Release 10),total 305 pages.
3GPP TS 36.331 V11.3.0,3rd Generation Partnership Project;Technical Specification Group Radio Access Network; Evolved Universal Terrestrial Radio Access (E-UTRA);Radio Resource Control (RRC); Protocol specification(Release 11),Mar. 2013. total 344 pages.
Alcatel-Lucent Shanghai Bell et al., Considerations on CSI feedback enhancements for high-priority antenna configurations, 3GPP TSG-RAN WG1#66 R1-112420, Aug. 26, 2011,total 8 pages.
Catt,"Performance evaluation of 8Tx precoding codebooks"3GPP TSG RAN WG1 Meeting #61 R1-102658,Montreal, Canada, May 10-14, 2010,total 7 pages.
CMCC et al.,"TP on multiple-column array antenna modeling",3GPP TSG-RAN4 Meeting #64bis R4-125978,Santa Rosa, US, Oct. 8-12, 2012,total 7 pages.
Pantech, Extension of Rel-8 codebook for dual stage Rel-10 precoder, 3GPP TSG-RAN WG1#60bis R1-102409, Apr. 16, 2010,total 3 pages.
R1-102724 LG Electronics,"Consideration on feedback design for LTE-A",3GPP TSG RAN WG1 Meeting #61, Montreal, Canada, May 10-14, 2010,total 4 pages.
RP-121413;"Study on Downlink Enhancements for Elevation Beamforming for LTE",3GPP Work Item Description, total 6 pages.
Samsung,"New SID Proposal: Study on Full Dimension MIMO for LTE",3GPP TSG RAN Meeting #57 RP-121410, Chicago, USA, Sep. 4-7, 2012,total 7 pages.
LG Electronics,"Feedback Codebook Enhancement and Performance Evaluation",3GPP TSG RAN WG1 Meeting #62 R1-104768,Madrid, Spain, Aug. 23-28, 2010,total 9 pages.
LG Electronics,"UCI transmission for Simultaneous PUCCH/PUSCH configuration",3GPP TSG Ran WG1 Meeting #63bis R1-110395,Dublin, Ireland, Jan. 17-21, 2011,total 4 pages.
Ericsson et al.,"Design and Evaluation of Precoder Codebooks for CSI Feedback",3GPP TSG-RAN WG1 #61bis R1-103839,Dresden, Germany, Jun. 28-Jul. 2, 2010,total 12 pages.

* cited by examiner

METHOD FOR DETERMINING PRECODING MATRIX INDICATOR, USER EQUIPMENT, AND BASE STATION

CROSS-REFERENCE TO RELATED APPLICATIONS

This application is a continuation of U.S. patent application Ser. No. 16/233,444, filed on Dec. 27, 2018, which is a continuation of U.S. patent application Ser. No. 16/107,653, filed on Aug. 21, 2018, now U.S. Pat. No. 10,263,674, which is a continuation of U.S. patent application Ser. No. 15/950,820, filed on Apr. 11, 2018, now U.S. Pat. No. 10,141,990, which is a continuation of U.S. patent application Ser. No. 14/936,092, filed on Nov. 9, 2015, now U.S. Pat. No. 9,967,008, which is a continuation of International Application No. PCT/CN2013/075486, filed on May 10, 2013. All of the aforementioned patent applications are hereby incorporated by reference in their entireties.

TECHNICAL FIELD

Embodiments of the present invention relate to the field of wireless communications, and in particular, to a method for determining a precoding matrix indicator, user equipment, and a base station.

BACKGROUND

By using a transmit beam forming (BF) or precoding technique and by using a receive signal combination technology, an multiple input multiple output (MIMO) wireless system can obtain diversity and array gains. A typical system that uses BF or precoding may usually be represented as:

$$y = HVs + n$$

where Y is a received signal vector, H is a channel matrix, v is a precoding matrix, is a transmitted symbol vector, and n is measured noise. Optimal precoding usually requires that a transmitter know entirely channel state information (CSI). In a common method, user equipment quantizes instantaneous CSI and feeds back the instantaneous CSI to a base station. CSI information fed back by an existing LTE R8 system includes an rank indicator (RI), a precoding matrix indicator (PMI), a channel quality indicator (CQI), and the like, where the RI and the PMI indicate respectively a quantity of used layers and a used precoding matrix. A set of used precoding matrices is generally referred to as a codebook (sometimes each precoding matrix in the set is referred to as a code word). An existing Long Term Evolution (LTE) R8 4-antenna codebook is designed based on Householder (Householder) transformation, and an R10 system further introduces double-codebook design for 8-antenna. The foregoing two codebooks are mainly for antenna design of a common base station. A common base station uses a fixed or remote electrical tilt downtilt to control a beam direction of an antenna in a vertical direction, and a beam direction of the antenna may be adjusted dynamically through precoding or beam forming only in a horizontal direction.

To reduce system costs and to achieve a higher system capacity and coverage requirement at the same time, an active antenna system (AAS) has been widely deployed in practice. For the currently launched LTE R12 standard, enhancement of communication performance after the AAS system is introduced is considered. Compared with a conventional base station antenna, the AAS further provides design flexibility in a vertical direction, and meanwhile, for convenience of deployment, antenna ports in the AS may be further increased. For example, a quantity of antenna ports included in the current LTE R12 and future evolved versions may be 8, 16, 32, 64 or even larger. A new requirement for codebook design, especially in aspects such as precoding performance, feedback overhead compromise, and air interface support, is proposed. In such a background, a new design solution for an AAS base station antenna, and especially for a precoding matrix and a feedback process of the AAS base station antenna, needs to be proposed.

SUMMARY

Embodiments of the present invention provide a method for determining a precoding matrix indicator, user equipment, and a base station, which can improve CSI feedback precision without excessively increasing feedback overhead, thereby improving system performance.

According to a first aspect, a method for determining a precoding matrix indicator is provided, including: receiving a first reference signal set sent by a base station, where the first reference signal set is associated with a user equipment-specific matrix or matrix set; selecting a precoding matrix based on the first reference signal set, where the precoding matrix is a function of the user equipment-specific matrix or matrix set; and sending a precoding matrix indicator PMI to the base station, where the PMI corresponds to the selected precoding matrix.

With reference to the first aspect and the foregoing implementation manner of the first aspect, in a first implementation manner of the first aspect, the user equipment-specific matrix or matrix set is notified by the base station to user equipment.

With reference to the first aspect and the foregoing implementation manners of the first aspect, in a second implementation manner of the first aspect, the first reference signal set includes one or more reference signal subsets, and the reference signal subset corresponds to a co-polarized antenna port subset, or corresponds to an antenna port subset that is arranged in a same direction in an antenna port array, or corresponds to an antenna port subset that is located at a quasi-co-location.

With reference to the first aspect and the foregoing implementation manners of the first aspect, in a third implementation manner of the first aspect, that the precoding matrix is a function of the user equipment-specific matrix or matrix set includes that: the precoding matrix W is a product of two matrices $W_1$ and $W_2$, $W = W_1 W_2$, where the matrix $W_1$ is a block diagonal matrix, the block diagonal matrix includes at least one block matrix, and each block matrix is a function of the user equipment-specific matrix or matrix set.

With reference to the first aspect and the foregoing implementation manners of the first aspect, in a fourth implementation manner of the first aspect, each block matrix X is a Kronecker kronecker product of two matrices C and D, $X = C \otimes D$, and at least one matrix in the two matrices C and D is a function of the user equipment-specific matrix or matrix set.

With reference to the first aspect and the foregoing implementation manners of the first aspect, in a fifth implementation manner of the first aspect, that at least one matrix in the two matrices c and D is a function of the user equipment-specific matrix or matrix set includes that:

a $k^{th}$ column vector c of the matrix C is:

$$c_k = \text{diag}\{1, e^{j2\pi/N_C}, \ldots, e^{j2\pi N_V/N_C}\}a_m,$$

or $$c_k = \text{diag}\{1, e^{j2\pi/N_C}, \ldots, e^{j2\pi(N_V/2-1)/N_C}, e^{j\theta}, e^{j\theta} e^{j2\pi/N_C}, \ldots, e^{j\theta} e^{j2\pi(N_V/2-1)/N_C}\}a_m$$

or; an $l^{th}$ column vector $d_l$ of the matrix D is:

$$d_l = \text{diag}\{1, e^{j2\pi/N_D}, \ldots, e^{j2\pi N_H/N_D}\}a_m$$

or $$d_l = \text{diag}\{1, e^{j2\pi/N_D}, \ldots, e^{j2\pi(N_H/2-1)/N_D}, e^{j\pi}, e^{j\pi}, e^{j2\pi(N_H/2-1)/N_D}\}a_m$$

where $N_V$, $N_H$, $N_C$, and $N_D$ are positive integers, $a_m$ is an $m^{th}$ column vector of a matrix A, the matrix A is a matrix in the user equipment-specific matrix or matrix set, and $\theta$ and $\phi$ are phase shifts.

With reference to the first aspect and the foregoing implementation manners of the first aspect, in a sixth implementation manner of the first aspect, that a matrix in the user equipment-specific matrix or matrix set is a matrix formed by columns being discrete Fourier transformation DFT vectors, or a matrix formed by column vectors of a Hadamard matrix or a Householder matrix.

With reference to the first aspect and the foregoing implementation manners of the first aspect, in a seventh implementation manner of the first aspect, that columns of the matrix in the user equipment-specific matrix or matrix set are discrete Fourier transformation DFT vectors includes that: the DFT vector $a_l$ satisfies:

$$a_l = \left[ e^{j\frac{2\pi \cdot 0 \cdot l}{N}} \quad e^{j\frac{2\pi \cdot 1 \cdot l}{N}} \quad \ldots \quad e^{j\frac{2\pi \cdot (M-1) \cdot l}{N}} \right]^T,$$

where $[\ ]^T$ is a matrix transpose, M and N are positive integers, and $N_C \geq N$ or $N_D \geq N$.

With reference to the first aspect and the foregoing implementation manners of the first aspect, in an eighth implementation manner of the first aspect, with reference to the first aspect and the foregoing implementation manners of the first aspect, in a sixth implementation manner of the first aspect, the first reference signal set includes at least one reference signal subset, and the reference signal subset is associated with a set of the matrix C or the matrix D.

With reference to the first aspect and the foregoing implementation manners of the first aspect, in a ninth implementation manner of the first aspect, the reference signal subset has a sending period longer than that of another reference signal.

According to a second aspect, a method for determining a precoding matrix indicator is provided, including: sending a first reference signal set to user equipment, where the first reference signal set is associated with a user equipment-specific matrix or matrix set; and receiving a precoding matrix indicator PMI sent by the user equipment, where the PMI is used for indicating a precoding matrix that is selected based on the first reference signal set by the user equipment, and the precoding matrix is a function of the user equipment-specific matrix or matrix set.

With reference to the second aspect and the foregoing implementation manners of the second aspect, in a first implementation manner of the second aspect, the user equipment-specific matrix or matrix set is notified by a base station to the user equipment.

With reference to the second aspect and the foregoing implementation manners of the second aspect, in a second implementation manner of the second aspect, the first reference signal set includes one or more reference signal subsets, and the reference signal subset corresponds to a co-polarized antenna port subset, or corresponds to an antenna port subset that is arranged in a same direction in an antenna port array, or corresponds to a quasi-co-location antenna port subset.

With reference to the second aspect and the foregoing implementation manners of the second aspect, in a third implementation manner of the second aspect, that the precoding matrix is a function of the user equipment-specific matrix or matrix set includes that: the precoding matrix w is a product of two matrices $W_1$ and $W_2$, $W = W_1 W_2$, where the matrix $W_1$ is a block diagonal matrix, the block diagonal matrix includes at least one block matrix, and each block matrix is a function of a matrix in the user equipment-specific matrix or matrix set.

With reference to the second aspect and the foregoing implementation manners of the second aspect, in a fourth implementation manner of the second aspect, each block matrix X is a Kronecker kronecker product of two matrices C and D, $X = C \otimes D$, and at least one matrix in the two matrices C and D is a function of the user equipment-specific matrix or matrix set.

With reference to the second aspect and the foregoing implementation manners of the second aspect, in a fifth implementation manner of the second aspect, that at least one matrix in the two matrices C and D is a function of the user equipment-specific matrix or matrix set includes that:

a $k^{th}$ column vector $c_k$ of the matrix C is:

$$c_k = \text{diag}\{1, e^{j2\pi/N_C}, \ldots, e^{j2\pi N_V/N_C}\}a_m,$$

or $$c_k = \text{diag}\{1, e^{j2\pi/N_C}, \ldots, e^{j2\pi(N_V/2-1)/N_C}, e^{j\theta\Delta}, e^{j\theta\Delta} e^{j2\pi/N_C}, \ldots, e^{j\theta\Delta} e^{j2\pi(N_V/2-1)/N_C}\}a_m$$

or; an $l^{th}$ column vector $d_l$ of the matrix D is:

$$d_l = \text{diag}\{1, e^{j2\pi/N_D}, \ldots, e^{j2\pi N_H/N_D}\}a_m$$

or $$d_l = \text{diag}\{1, e^{j2\pi/N_D}, \ldots, e^{j2\pi(N_H/2-1)/N_D}, e^{j\phi}, e^{j\phi} e^{j2\pi/N_D}, \ldots, e^{j\phi} e^{j2\pi(N_H/2-1)/N_D}\}a_m$$

where $N_V$, $N_H$, $N_C$, and $N_D$ are positive integers, $a_m$ is an $m^{th}$ column vector of a matrix A, the matrix A is a matrix in the user equipment-specific matrix or matrix set, and $\theta$ and $\phi$ are phase shifts.

With reference to the second aspect and the foregoing implementation manners of the second aspect, in a sixth implementation manner of the second aspect, a matrix in a subset of the user equipment-specific matrix or matrix set is a matrix formed by columns being discrete Fourier transformation DFT vectors, or a matrix formed by column vectors of a Hadamard matrix or a Householder matrix.

With reference to the second aspect and the foregoing implementation manners of the second aspect, in a seventh implementation manner of the second aspect, that columns of the matrix in the subset of the user equipment-specific matrix or matrix set are discrete Fourier transformation DFT vectors includes that: the DFT vector $a_l$ satisfies:

$$a_l = \left[ e^{j\frac{2\pi \cdot 0 \cdot l}{N}} \quad e^{j\frac{2\pi \cdot 1 \cdot l}{N}} \quad \ldots \quad e^{j\frac{2\pi \cdot (M-1) \cdot l}{N}} \right]^T,$$

where $[\ ]^T$ is a matrix transpose, M and N are positive integers, and $N_C \geq N$ or $N_D \geq N$.

With reference to the second aspect and the foregoing implementation manners of the second aspect, in an eighth implementation manner of the second aspect, the first reference signal set includes at least one reference signal subset, and the reference signal subset is associated with a set of the matrix C or the matrix D.

With reference to the second aspect and the foregoing implementation manners of the second aspect, in a ninth implementation manner of the second aspect, the reference signal subset has a sending period longer than that of another reference signal.

According to a third aspect, user equipment is provided, including: a receiving unit, configured to receive a first reference signal set sent by a base station, where the first reference signal set is associated with a user equipment-specific matrix or matrix set; a determining unit, configured to select a precoding matrix based on the first reference signal set, where the precoding matrix is a function of the user equipment-specific matrix or matrix set; and a sending unit, configured to send a precoding matrix indicator PMI to the base station, where the PMI corresponds to the selected precoding matrix.

With reference to the third aspect and the foregoing implementation manner of the third aspect, in a first implementation manner of the third aspect, the receiving unit is further configured to receive the user equipment-specific matrix or matrix set notified by the base station.

With reference to the third aspect and the foregoing implementation manners of the third aspect, in a second implementation manner of the third aspect, the first reference signal set includes one or more reference signal subsets, and the reference signal subset corresponds to a co-polarized antenna port subset, or corresponds to an antenna port subset that is arranged in a same direction in an antenna port array, or corresponds to an antenna port subset that is located at a quasi-co-location.

With reference to the third aspect and the foregoing implementation manners of the third aspect, in a third implementation manner of the third aspect, the precoding matrix w is a product of two matrices $W_1$ and $W_2$, $W=W_1 W_2$ where the matrix $W_1$ is a block diagonal matrix, the block diagonal matrix includes at least one block matrix, and each block matrix is a function of the user equipment-specific matrix or matrix set.

With reference to the third aspect and the foregoing implementation manners of the third aspect, in a fourth implementation manner of the third aspect, each block matrix X is a Kronecker kronecker product of two matrices C and D, $X=C \otimes D$, and at least one matrix in the two matrices C and D is a function of the user equipment-specific matrix or matrix set.

With reference to the third aspect and the foregoing implementation manners of the third aspect, in a fifth implementation manner of the third aspect, that at least one matrix in the two matrices C and D is a function of the user equipment-specific matrix or matrix set includes:

a $k^{th}$ column vector $c_k$ of the matrix C is:

$$c_k = \text{diag}\{1, e^{j2\pi/N_C}, \ldots, e^{j2\pi N_V/N_C}\} a_m,$$

or $$c_k = \text{diag}\{1, e^{j2\pi/N_C}, \ldots, e^{j2\pi(N_V/2-1)/N_C}, e^{j\theta}, e^{j\theta} e^{j2\pi/N_C}, \ldots, e^{j\theta} e^{j2\pi(N_V/2-1)/N_C}\} a_m$$

or; an $l^{th}$ column vector $d_l$ of the matrix D is:

$$d_l = \text{diag}\{1, e^{j2\pi/N_D}, \ldots, e^{j2\pi N_H/N_D}\} a_m$$

or $$d_l = \text{diag}\{1, e^{j2\pi/N_D}, \ldots, e^{j2\pi(N_H/2-1)/N_D}, e^{j\phi}, e^{j\phi} e^{j2\pi/N_D}, \ldots, e^{j\phi} e^{j2\pi(N_H/2-1)/N_D}\} a_m$$

where $N_V$, $N_H$, $N_C$, and $N_D$ are positive integers, $a_m$ is an $m^{th}$ column vector of a matrix A, the matrix A is a matrix in the user equipment-specific matrix or matrix set, and $\theta$ and $\phi$ are phase shifts.

With reference to the third aspect and the foregoing implementation manners of the third aspect, in a sixth implementation manner of the third aspect, a matrix in a subset of the user equipment-specific matrix or matrix set is a matrix formed by columns being discrete Fourier transformation DFT vectors, or a matrix formed by column vectors of a Hadamard matrix or a Householder matrix.

With reference to the third aspect and the foregoing implementation manners of the third aspect, in a seventh implementation manner of the third aspect, the DFT vector $a_l$ satisfies:

$$a_l = \left[\ e^{j\frac{2\pi \cdot 0 \cdot l}{N}}\ \ e^{j\frac{2\pi \cdot 1 \cdot l}{N}}\ \ \ldots\ \ e^{j\frac{2\pi \cdot (M-1) \cdot l}{N}}\ \right]^T,$$

where $[\ ]^T$ is a matrix transpose, M and N are positive integers, and $N_C \geq N$ or $N_D \geq N$.

With reference to the third aspect and the foregoing implementation manners of the third aspect, in an eighth implementation manner of the third aspect, the first reference signal set includes at least one reference signal subset, and the reference signal subset is associated with a set of the matrix C or the matrix D.

With reference to the third aspect and the foregoing implementation manners of the third aspect, in a ninth implementation manner of the third aspect, the reference signal subset has a sending period longer than that of another reference signal.

According to a fourth aspect, a base station is provided, including: a sending unit, configured to send a first reference signal set to user equipment, where the first reference signal set is associated with a user equipment-specific matrix or matrix set; and a receiving unit, configured to receive a precoding matrix indicator PMI sent by the user equipment, where the PMI is used for indicating a precoding matrix that is selected based on the first reference signal set by the user equipment, and the precoding matrix is a function of the user equipment-specific matrix or matrix set.

With reference to the fourth aspect and the foregoing implementation manner of the fourth aspect, in a first implementation manner of the fourth aspect, the sending unit is further configured to notify the user equipment of the user equipment-specific matrix or matrix set.

With reference to the fourth aspect and the foregoing implementation manners of the fourth aspect, in a second implementation manner of the fourth aspect, the first reference signal set includes one or more reference signal subsets, and the reference signal subset corresponds to a co-polarized antenna port subset, or corresponds to an antenna port subset that is arranged in a same direction in an antenna port array, or corresponds to a quasi-co-location antenna port subset.

With reference to the fourth aspect and the foregoing implementation manners of the fourth aspect, in a third implementation manner of the fourth aspect, the precoding matrix W is a product of two matrices $W_1$ and $W_2$, $W=W_1W_2$, where the matrix $W_1$ is a block diagonal matrix, the block diagonal matrix includes at least one block matrix, and each block matrix is a function of the user equipment-specific matrix or matrix set.

With reference to the fourth aspect and the foregoing implementation manners of the fourth aspect, in a fourth implementation manner of the fourth aspect, each block matrix X is a Kronecker kronecker product of two matrices C and D, $X=C\otimes D$, and at least one matrix in the two matrices C and D is a function of the user equipment-specific matrix or matrix set.

With reference to the fourth aspect and the foregoing implementation manners of the fourth aspect, in a fifth implementation manner of the fourth aspect, that at least one matrix in the two matrices C and D is a function of the user equipment-specific matrix or matrix set includes that:

a $k^{th}$ column vector $c_k$ of the matrix C is:

$$c_k=\{1,e^{j2\pi/N_C},\ldots,e^{j2\pi N_V/N_C}\}a_m,$$

or $$c_k=\text{diag}\{1,e^{j2\pi/N_C},\ldots,e^{j2\pi(N_V/2-1)/N_C},e^{j\theta},e^{j\theta}e^{j2\pi(N_V/2-1)/N_C}\}a_m$$

or; an $l^{th}$ column vector $d_l$ of the matrix D is:

$$d_l=\text{diag}\{1,e^{j2\pi/N_D},\ldots,e^{j2\pi N_H/N_D}\}a_m$$

or $$d_l=\text{diag}\{1,e^{j2\pi/N_D},\ldots,e^{j2\pi(N_H/2-1)/N_D},e^{j\phi},e^{j\phi}e^{j2\pi N_D},\ldots,e^{j\phi}e^{j2\pi(N_H/2-1)/N_D}\}a_m$$

where $N_V$, $N_H$, $N_C$, and $N_D$ are positive integers, $a_m$ is an $m^{th}$ column vector of a matrix A, the matrix A is a matrix in the user equipment-specific matrix or matrix set, and $\theta$ and $\phi$ are phase shifts.

With reference to the fourth aspect and the foregoing implementation manners of the fourth aspect, in a sixth implementation manner of the fourth aspect, a matrix in the user equipment-specific matrix or matrix set is a matrix formed by columns being discrete Fourier transformation DFT vectors, or a matrix formed by column vectors of a Hadamard matrix or a Householder matrix.

With reference to the fourth aspect and the foregoing implementation manners of the fourth aspect, in a seventh implementation manner of the fourth aspect, that columns of the matrix in the user equipment-specific matrix or matrix set are discrete Fourier transformation DFT vectors includes that: the DFT vector $a_l$ satisfies:

$$a_l = \begin{bmatrix} e^{j\frac{2\pi\cdot 0\cdot l}{N}} & e^{j\frac{2\pi\cdot 1\cdot l}{N}} & \ldots & e^{j\frac{2\pi\cdot(M-1)l}{N}} \end{bmatrix}^T,$$

where $[\ ]^T$ is a matrix transpose, M and N are positive integers, and $N_C \geq N$ or $N_D \geq N$.

With reference to the fourth aspect and the foregoing implementation manners of the fourth aspect, in an eighth implementation manner of the fourth aspect, the first reference signal set includes at least one reference signal subset, and the reference signal subset is associated with a set of the matrix C or the matrix D.

With reference to the fourth aspect and the foregoing implementation manners of the fourth aspect, in a ninth implementation manner of the fourth aspect, the reference signal subset has a sending period longer than that of another reference signal.

According to a fifth aspect, user equipment is provided, including: a receiver, configured to receive a first reference signal set sent by a base station, where the first reference signal set is associated with a user equipment-specific matrix or matrix set; a processor, configured to select a precoding matrix based on the first reference signal set, where the precoding matrix is a function of the user equipment-specific matrix or matrix set; and a transmitter, configured to send a precoding matrix indicator PMI to the base station, where the PMI corresponds to the selected precoding matrix.

With reference to the fifth aspect and the foregoing implementation manner of the fifth aspect, in a first implementation manner of the fifth aspect, the receiver is further configured to receive the user equipment-specific matrix or matrix set notified by the base station.

With reference to the fifth aspect and the foregoing implementation manners of the fifth aspect, in a second implementation manner of the fifth aspect, the first reference signal set includes one or more reference signal subsets, and the reference signal subset corresponds to a co-polarized antenna port subset, or corresponds to an antenna port subset that is arranged in a same direction in an antenna port array, or corresponds to an antenna port subset that is located at a quasi-co-location.

With reference to the fifth aspect and the foregoing implementation manners of the fifth aspect, in a third implementation manner of the fifth aspect, the precoding matrix w is a product of two matrices $W_1$ and $W_2$, $W=W_1W_2$, where the matrix $W_1$ is a block diagonal matrix, the block diagonal matrix includes at least one block matrix, and each block matrix is a function of the user equipment-specific matrix or matrix set.

With reference to the fifth aspect and the foregoing implementation manners of the fifth aspect, in a fourth implementation manner of the fifth aspect, each block matrix X is a Kronecker kronecker product of two matrices C and D, $X=C\otimes D$, and at least one matrix in the two matrices C and D is a function of the user equipment-specific matrix or matrix set.

With reference to the fifth aspect and the foregoing implementation manners of the fifth aspect, in a fifth implementation manner of the fifth aspect, that at least one matrix in the two matrices C and D is a function of the user equipment-specific matrix or matrix set includes that:

a $k^{th}$ column vector $c_k$ of the matrix C is:

$$c_k=\text{diag}\{1,e^{j2\pi/N_C},\ldots,e^{j2\pi N_V/N_C}\}a_m,$$

or $$c_k=\text{diag}\{1,e^{j2\pi/N_C},\ldots,e^{j2\pi(N_V/2-1)/N_C},e^{j\theta},e^{j\theta}e^{j2\pi/N_C},\ldots,e^{j\theta}e^{j2\pi(N_V/2-1)/N_C}\}a_m$$

or; an $l^{th}$ column vector $d_l$ of the matrix D is:

$$d_l=\text{diag}\{1,e^{j2\pi/N_D},\ldots,e^{j2\pi N_H/N_D}\}a_m$$

or $$d_l=\text{diag}\{1,e^{j2\pi/N_D},\ldots,e^{j2\pi(N_H/2-1)/N_D},e^{j\phi},e^{j\phi}e^{j2\pi/N_D},\ldots,e^{j\phi}e^{j2\pi(N_H/2-1)/N_D}\}a_m$$

where $N_V$, $N_H$, $N_C$, and $N_D$ are positive integers, $a_m$ is an $m^{th}$ column vector of a matrix A, the matrix A is a matrix in the user equipment-specific matrix or matrix set, and $\theta$ and $\phi$ are phase shifts.

With reference to the fifth aspect and the foregoing implementation manners of the fifth aspect, in a sixth implementation manner of the fifth aspect, a matrix in the user equipment-specific matrix or matrix set is a matrix formed by columns being discrete Fourier transformation DFT vectors, or a matrix formed by column vectors of a Hadamard matrix or a Householder matrix.

With reference to the fifth aspect and the foregoing implementation manners of the fifth aspect, in a seventh implementation manner of the fifth aspect, the DFT vector $a_l$ satisfies:

$$a_l = \left[\ e^{j\frac{2\pi \cdot 0 \cdot l}{N}}\ \ e^{j\frac{2\pi \cdot 1 \cdot l}{N}}\ \ \ldots\ \ e^{j\frac{2\pi \cdot (M-1) \cdot l}{N}}\ \right]^T,$$

where $[\ ]^T$ is a matrix transpose, M and N are positive integers, and $N_C \geq N$ or $N_D \geq N$.

With reference to the fifth aspect and the foregoing implementation manners of the fifth aspect, in an eighth implementation manner of the fifth aspect, the first reference signal set includes at least one reference signal subset, and the reference signal subset is associated with a set of the matrix C or the matrix D.

With reference to the fifth aspect and the foregoing implementation manners of the fifth aspect, in a ninth implementation manner of the fifth aspect, the reference signal subset has a sending period longer than that of another reference signal.

According to a sixth aspect, a base station is provided, including: a transmitter, configured to send a first reference signal set to user equipment, where the first reference signal set is associated with a user equipment-specific matrix or matrix set; and a receiver, configured to receive a precoding matrix indicator PMI sent by the user equipment, where the PMI is used for indicating a precoding matrix that is selected based on the first reference signal set by the user equipment, and the precoding matrix is a function of a subset of the user equipment-specific matrix or matrix set.

With reference to the sixth aspect and the foregoing implementation manner of the sixth aspect, in a first implementation manner of the sixth aspect, the transmitter is further configured to notify the user equipment of the user equipment-specific matrix or matrix set.

With reference to the sixth aspect and the foregoing implementation manners of the sixth aspect, in a second implementation manner of the sixth aspect, the first reference signal set includes one or more reference signal subsets, and the reference signal subset corresponds to a co-polarized antenna port subset, or corresponds to an antenna port subset that is arranged in a same direction in an antenna port array, or corresponds to a quasi-co-location antenna port subset.

With reference to the sixth aspect and the foregoing implementation manners of the sixth aspect, in a third implementation manner of the sixth aspect, the precoding matrix w is a product of two matrices $W_1$ and $W_2$, $W = W_1 W_2$ where the matrix $W_1$ is a block diagonal matrix, the block diagonal matrix includes at least one block matrix, and each block matrix is a function of the user equipment-specific matrix or matrix set.

With reference to the sixth aspect and the foregoing implementation manners of the sixth aspect, in a fourth implementation manner of the sixth aspect, each block matrix X is a Kronecker kronecker product of two matrices C and D, $X = C \otimes D$, and at least one matrix in the two matrices C and D is a function of the user equipment-specific matrix or matrix set.

With reference to the sixth aspect and the foregoing implementation manners of the sixth aspect, in a fifth implementation manner of the sixth aspect, that at least one matrix in the two matrices C and D is a function of the user equipment-specific matrix or matrix set includes that:

a $k^{th}$ column vector $c_k$ of the matrix C is:

$$c_k = \text{diag}\{1, e^{j2\pi/N_C}, \ldots, e^{j2\pi N_V/N_C}\} a_m,$$

or $$c_k = \text{diag}\{1, e^{j2\pi/N_C}, \ldots, e^{j2\pi(N_V/2-1)/N_C}, e^{j\theta}, e^{j\theta} e^{j2\pi/N_C}, \ldots, e^{j\theta} e^{j2\pi(N_V/2-1)/N_C}\} a_m$$

or; an $l^{th}$ column vector $d_l$ of the matrix D is:

$$d_l = \text{diag}\{1, e^{j2\pi/N_D}, \ldots, e^{j2\pi N_H/N_D}\} a_m,$$

or $$d_l = \text{diag}\{1, e^{j2\pi/N_D}, \ldots, e^{j2\pi(N_H/2-1)/N_D}, e^{j\phi}, e^{j\phi} e^{j2\pi/N_D}, \ldots, e^{j\phi} e^{j2\pi(N_H/2-1)/N_D}\} a_m$$

where $N_V$, $N_H$, $N_C$, and $N_D$ are positive integers, $a_m$ is an $m^{th}$ column vector of a matrix A, the matrix A is a matrix in the user equipment-specific matrix or matrix set, and $\theta$ and $\phi$ are phase shifts.

With reference to the sixth aspect and the foregoing implementation manners of the sixth aspect, in a sixth implementation manner of the sixth aspect, a matrix in the user equipment-specific matrix or matrix set is a matrix formed by columns being discrete Fourier transformation DFT vectors, or a matrix formed by column vectors of a Hadamard matrix or a Householder matrix.

With reference to the sixth aspect and the foregoing implementation manners of the sixth aspect, in a seventh implementation manner of the sixth aspect, that columns of the matrix in the user equipment-specific matrix or matrix set are discrete Fourier transformation DFT vectors includes that: the DFT vector $a_l$ satisfies:

$$a_l = \left[\ e^{j\frac{2\pi \cdot 0 \cdot l}{N}}\ \ e^{j\frac{2\pi \cdot 1 \cdot l}{N}}\ \ \ldots\ \ e^{j\frac{2\pi \cdot (M-1) \cdot l}{N}}\ \right]^T,$$

where $[\ ]^T$ is a matrix transpose, M and N are positive integers, and $N_C \geq N$ or $N_D \geq N$.

With reference to the sixth aspect and the foregoing implementation manners of the sixth aspect, in an eighth implementation manner of the sixth aspect, the first reference signal set includes at least one reference signal subset, and the reference signal subset is associated with a set of the matrix C or the matrix D.

With reference to the sixth aspect and the foregoing implementation manners of the sixth aspect, in a ninth implementation manner of the sixth aspect, the first reference signal set includes at least one reference signal subset, and the reference signal subset has a sending period longer than that of another reference signal.

In the embodiments of the present invention, a first reference signal set is associated with a user equipment-specific matrix or matrix set, a precoding matrix is a function of the user equipment-specific matrix or matrix set, so that user equipment can select, based on the user equipment-specific matrix or matrix set, the precoding matrix and feed back a PMI, and a set of the precoding matrix forms a user equipment-specific codebook but not a cell specific codebook or system specific codebook. The cell specific codebook or system specific codebook is a precoding matrix set designed for all users in a cell or a system, while the user equipment-specific codebook is a subset of the cell specific codebook or system specific codebook. Therefore, in the embodiments of the present invention, CSI feedback precision can be improved without excessively increasing feedback overhead, thereby improving system performance.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (GSM), a Code Division Multiple Access (CDMA) system, a Wideband Code Division Multiple Access (WCDMA), a general packet radio service (GPRS), and a Long Term Evolution (LTE) system.

User equipment (UE), also referred to as a mobile terminal (Mobile Terminal), a mobile user equipment, and the like, may communicate with one or more core networks through a radio access network (RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, or may be a relay (Relay), and the user equipment exchanges language and/or data with the radio access network.

A base station may be a base station (BTS) in the GSM or CDMA, may also be a base station (NodeB) in the WCDMA, and may further be an evolved NodeB (eNB or e-NodeB, evolved Node B) or relay (Relay) in the LTE, which is not limited in the present invention.

Figure 1:
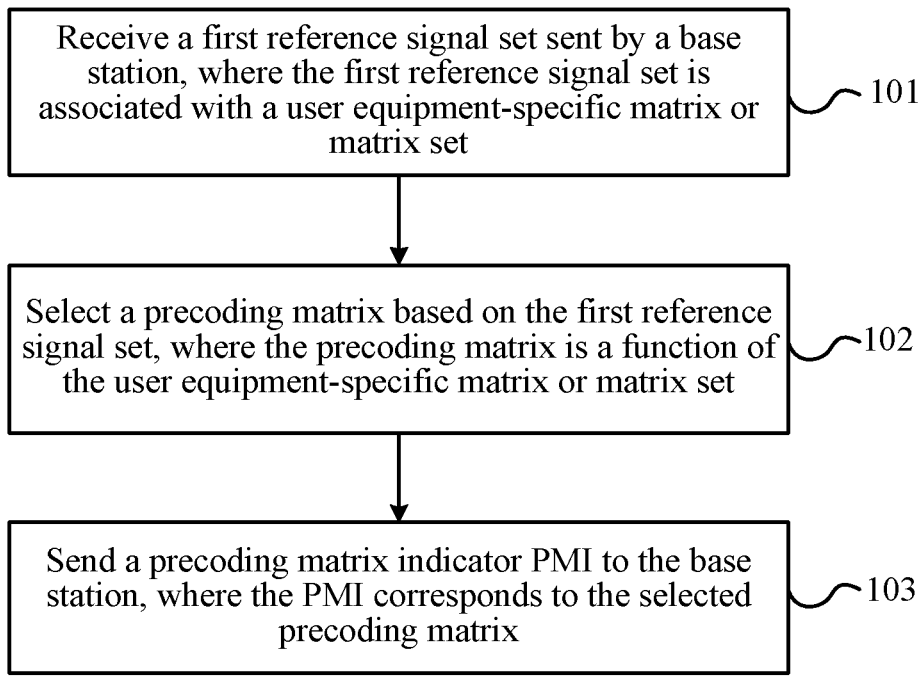
FIG. 1 is a flowchart of a method for determining a precoding matrix indicator according to an embodiment of the present invention.

FIG. 1 is a flowchart of a method for determining a precoding matrix indicator according to an embodiment of the present invention. The method in FIG. 1 is executed by user equipment (for example, UE).

101: Receive a first reference signal set sent by a base station, where the first reference signal set is associated with a user equipment-specific (UE-specific) matrix or matrix set.

102: Select a precoding matrix based on the first reference signal set, where the precoding matrix is a function of a user equipment-specific matrix or matrix set.

103: Send a precoding matrix indicator PMI to the base station, where the PMI corresponds to the selected precoding matrix.

In this embodiment of the present invention, a first reference signal set is associated with a user equipment-specific matrix or matrix set, a precoding matrix is a function of the user equipment-specific matrix or matrix set, so that user equipment can select, based on the user equipment-specific matrix or matrix set, the precoding matrix and feed back a PMI, and a set of the precoding matrix forms a user equipment-specific codebook but not a cell specific codebook or system specific codebook (cell specific codebook or system specific codebook). The cell specific codebook or system specific codebook is a precoding matrix set designed for all users in a cell or a system, while the user equipment-specific codebook is a subset of the cell specific codebook or system specific codebook. Therefore, in this embodiment of the present invention, CSI feedback precision can be improved without excessively increasing feedback overhead, thereby improving system performance.

It should be understood that a matrix may include a multi-row multi-column matrix, or may also include a multi-row single-column vector, a single-row multi-column vector, or a scalar (single-row single-column matrix).

Optionally, as an embodiment, the user equipment-specific matrix or matrix set is notified by the base station to the user equipment.

Optionally, as another embodiment, before step 101, the user equipment may further receive a second reference signal set sent by the base station, where the second reference signal set is associated with a matrix or matrix set. Based on the second reference signal set, the user equipment determines and sends a second index to the base station. The second index is used for indicating an antenna port or antenna port subset selected by the user equipment, or a subset of a matrix or matrix set that is associated with the antenna port or antenna port subset selected by the user equipment.

Optionally, the first reference signal set may be a subset of the second reference signal set.

Optionally, as another embodiment, when receiving the second reference signal set sent by the base station, the user equipment may receive reference signals of the second reference signal set that are sent at different times by the base station. Here, different times may be associated with a same matrix or different matrices separately, or may be associated with a same subset or different subsets of a matrix set separately.

Optionally, the matrix or matrix set associated with the second reference signal set is cell specific or system specific.

Optionally, as another embodiment, the first reference signal set includes one or more reference signal subsets, and the reference signal subset corresponds to a co-polarized antenna port subset, or corresponds to an antenna port subset that is arranged in a same direction in an antenna port array, or corresponds to a quasi-co-location (Quasi-Co-Location, QCL for short) antenna port subset.

Optionally, as another embodiment, when receiving the first reference signal set sent by the base station, the user equipment may receive reference signals of the first reference signal set that are sent at different times by the base station. Here, different times may be associated with a same matrix or different matrices separately, or may be associated with a same subset or different subsets of a matrix set separately.

Optionally, as another embodiment, the precoding matrix w is a product of two matrices $W_1$ and $W_2$.

$$W = W_1 W_2 \tag{1}$$

The matrix $W_1$ is a block diagonal matrix. The block diagonal matrix includes at least one block matrix, and each block matrix is a function of the user equipment-specific matrix or matrix set.

Optionally, the matrix $W_2$ is used to select or perform weighted combination on column vectors in the matrix $W_1$, so as to form the matrix w.

Optionally, as another embodiment, each block matrix X is a Kronecker (kronecker) product of two matrices C and D, $X = C \otimes D$. At least one matrix in the two matrices C and D is a function of the user equipment-specific matrix or matrix set.

Optionally, as another embodiment, columns of at least one matrix in the two matrices C and D are rotations of column vectors in a matrix in a subset of the user equipment-specific matrix or matrix set, that is, a $k^{th}$ column vector $c_k$ of the matrix C is:

$$c_k = \mathrm{diag}\{1, e^{j2\pi/N_C}, \ldots, e^{j2\pi N_V/N_C}\} a_m, \tag{2}$$

or $$c_k = \mathrm{diag}\{1, e^{j2\pi/N_C}, \ldots, e^{j2\pi(N_V/2-1)/N_C}, e^{j\theta}, e^{j\theta} e^{j2\pi/N_C}, \ldots, e^{j\theta} e^{j2\pi(N_V/2-1)/N_C}\} a_m, \tag{3}$$

or, an $l^{th}$ column vector $d_l$ of the matrix D is:

$$d_l = \mathrm{diag}\{1, e^{j2\pi/N_D}, \ldots, e^{j2\pi N_H/N_D}\} a_m, \tag{4}$$

or $$d_l = \mathrm{diag}\{1, e^{j2\pi/N_D}, \ldots, e^{j2\pi(N_H/2-1)/N_D}, e^{j\phi}, e^{j\phi} e^{j2\pi/N_d}, \ldots, e^{j\phi} e^{j2\pi(N_H/2-1)/N_D}\} a_m, \tag{5}$$

where $N_V$, $N_H$, $N_C$, and $N_D$ are positive integers, $a_m$ is an $m^{th}$ column vector of a matrix A, the matrix A is a matrix in the user equipment-specific matrix or matrix set, and $\theta$ and $\phi$ are phase shifts whose values may be $0, \pi, \pm \pi/2, \pm \pi/4, \pm \pi/8$, and so on.

It should be noted that a value of $N_C$ or $N_D$ may be infinite, and therefore $2\pi/N_C = 0$ or $2\pi/N_D = 0$, and in this case, $c_k = a_m$, $c_k = \mathrm{diag}\{1,1,\ldots,1,e^{j\theta},e^{j\theta},\ldots,e^{j\theta}\}a_m$, $d_l = a_m$ or $d_l = \mathrm{diag}\{1,1,\ldots,1,e^{j\phi},e^{j\phi},\ldots,e^{j\phi}\}a_m$.

It should be noted that, that column vectors of the matrix C or matrix D that corresponds to the block matrix X at a different location on a diagonal in $W_1$ satisfy the expressions (2) to (5) does not mean that the block matrix X at a different location on a diagonal in $W_1$ has a same matrix C or matrix D; in contrast, the block matrix X at a different location may have a same or different matrix C or matrix D.

Optionally, as another embodiment, a matrix in the user equipment-specific matrix or matrix set is a matrix formed by columns being discrete Fourier transformation (DFT, Discrete Fourier Transformation) vectors, or a matrix formed by column vectors of a Hadamard matrix or a Householder matrix.

Optionally, as another embodiment, the DFT vector $a_l$ satisfies:

$$a_l = \left[ e^{j\frac{2\pi \cdot 0 \cdot l}{N}} \quad e^{j\frac{2\pi \cdot 1 \cdot l}{N}} \quad \ldots \quad e^{j\frac{2\pi \cdot (M-1) \cdot l}{N}} \right]^T \tag{6}$$

where $[\ ]^T$ is a matrix transpose, M and N are positive integers, and $N_C \geq N$ or $N_D \geq N$.

Optionally, as another embodiment, the first reference signal set includes at least one reference signal subset, and the reference signal subset is associated with a set of the matrix C or the matrix D.

Optionally, as another embodiment, the reference signal subset has a sending period longer than that of another reference signal.

As an embodiment of the present invention, the precoding matrix W may be the following matrix:

$$(2M)^{-\frac{1}{2}}[1 \quad e^{j\theta} \quad \ldots \quad e^{j(M-1)\theta} \quad e^{j\varphi} \quad e^{j(\varphi+\theta)} \quad \ldots \quad e^{j(\varphi+(M-1)\theta)}]^T$$

or, $$(4M)^{-\frac{1}{2}}\begin{bmatrix} [1 \quad e^{j\theta} \quad \ldots \quad e^{j(M-1)\theta} \quad e^{j\phi} \quad e^{j(\phi+\theta)} \quad \ldots \quad e^{j(\phi+(M-1)\theta)}]^T \\ e^{j\varphi}[1 \quad e^{j\theta} \quad \ldots \quad e^{j(M-1)\theta} \quad e^{j\phi} \quad e^{j(\phi+\theta)} \quad \ldots \quad e^{j(\phi+(M-1)\theta)}]^T \end{bmatrix}$$

or, $$(2NM)^{-\frac{1}{2}} \begin{bmatrix} \begin{bmatrix} [1 \quad e^{j\theta} \quad \ldots \quad e^{j(M-1)\theta}]^T \\ e^{j\phi}[1 \quad e^{j\theta} \quad \ldots \quad e^{j(M-1)\theta}]^T \\ \ldots \\ e^{j(N-1)\phi}[1 \quad e^{j\theta} \quad \ldots \quad e^{j(M-1)\theta}]^T \end{bmatrix} \\ e^{j\phi} \begin{bmatrix} [1 \quad e^{j\theta} \quad \ldots \quad e^{j(M-1)\theta}]^T \\ e^{j\phi}[1 \quad e^{j\theta} \quad \ldots \quad e^{j(M-1)\theta}]^T \\ \ldots \\ e^{j(N-1)\phi}[1 \quad e^{j\theta} \quad \ldots \quad e^{j(M-1)\theta}]^T \end{bmatrix} \end{bmatrix}$$

where $\varphi = 0, \pi/2, \pi, 3\pi/2, \ldots$, $$\theta = \frac{\pi}{16}(2i_1 + \lfloor i_2/4 \rfloor),$$

$i_1 = 0, \ldots, 15$, $i_2 = 0, \ldots, 15$, and a symbol "$\lfloor x \rfloor$" represents a maximum integer that is not greater than x.

$$\phi = \frac{k\pi}{32},$$

$k = 0, \ldots, 15, \ldots, 32$, and so on, or $k = 0, \pm 1, \ldots, \pm 15, \pm 16$, and so on.

M is a positive integer; for example, a value of M may be 1, 2, 4, 6, 8, 16, 32, 64, and so on. N is a positive integer; for example, a value of N may be 1, 2, 4, 6, 8, 16, 32, 64, and so on.

As another embodiment of the present invention, the precoding matrix w may be the following matrix:

$$(4NM)^{-\frac{1}{2}} \begin{bmatrix} \begin{bmatrix} [1 \quad e^{j\theta} \quad \ldots \quad e^{j(M-1)\theta}]^T & [1 \quad e^{j\theta} \quad \ldots \quad e^{j(M-1)\theta}]^T \\ e^{j\phi}[1 \quad e^{j\theta} \quad \ldots \quad e^{j(M-1)\theta}]^T & e^{j\phi}[1 \quad e^{j\theta} \quad \ldots \quad e^{j(M-1)\theta}]^T \\ \ldots & \ldots \\ e^{j(N-1)\phi}[1 \quad e^{j\theta} \quad \ldots \quad e^{j(M-1)\theta}]^T & e^{j(N-1)\phi}[1 \quad e^{j\theta} \quad \ldots \quad e^{j(M-1)\theta}]^T \end{bmatrix} \\ \begin{bmatrix} [1 \quad e^{j\theta} \quad \ldots \quad e^{j(M-1)\theta}]^T & -[1 \quad e^{j\theta} \quad \ldots \quad e^{j(M-1)\theta}]^T \\ e^{j\phi}[1 \quad e^{j\theta} \quad \ldots \quad e^{j(M-1)\theta}]^T & -e^{j\phi}[1 \quad e^{j\theta} \quad \ldots \quad e^{j(M-1)\theta}]^T \\ \ldots & \ldots \\ e^{j(N-1)\phi}[1 \quad e^{j\theta} \quad \ldots \quad e^{j(M-1)\theta}]^T & -e^{j(N-1)\phi}[1 \quad e^{j\theta} \quad \ldots \quad e^{j(M-1)\theta}]^T \end{bmatrix} \end{bmatrix}$$

or $$(4NM)^{-\frac{1}{2}} \begin{bmatrix} \begin{bmatrix} [1 \quad e^{j\theta} \quad \ldots \quad e^{j(M-1)\theta}]^T & [1 \quad e^{j\theta} \quad \ldots \quad e^{j(M-1)\theta}]^T \\ e^{j\phi}[1 \quad e^{j\theta} \quad \ldots \quad e^{j(M-1)\theta}]^T & e^{j\phi}[1 \quad e^{j\theta} \quad \ldots \quad e^{j(M-1)\theta}]^T \\ \ldots & \ldots \\ e^{j(N-1)\phi}[1 \quad e^{j\theta} \quad \ldots \quad e^{j(M-1)\theta}]^T & e^{j(N-1)\phi}[1 \quad e^{j\theta} \quad \ldots \quad e^{j(M-1)\theta}]^T \end{bmatrix} \\ \begin{bmatrix} j[1 \quad e^{j\theta} \quad \ldots \quad e^{j(M-1)\theta}]^T & -j[1 \quad e^{j\theta} \quad \ldots \quad e^{j(M-1)\theta}]^T \\ je^{j\phi}[1 \quad e^{j\theta} \quad \ldots \quad e^{j(M-1)\theta}]^T & -je^{j\phi}[1 \quad e^{j\theta} \quad \ldots \quad e^{j(M-1)\theta}]^T \\ \ldots & \ldots \\ je^{j(N-1)\phi}[1 \quad e^{j\theta} \quad \ldots \quad e^{j(M-1)\theta}]^T & -je^{j(N-1)\phi}[1 \quad e^{j\theta} \quad \ldots \quad e^{j(M-1)\theta}]^T \end{bmatrix} \end{bmatrix}$$

where $$\theta = \frac{\pi}{16}(2i_1 + \lfloor i_2/4 \rfloor),$$

$i_1=0, \ldots, 15$, $i_2=0, \ldots, 15$, and a symbol "$\lfloor x \rfloor$" represents a maximum integer that is not greater than x.

$$\phi = \frac{k\pi}{32},$$

K=0, ..., 15, ..., 32, and so on, or k=0, ±1, ..., ±15, ±16, and so on.

M is a positive integer; for example, a value of M may be 1, 2, 4, 6, 8, 16, 32, 64, and so on. N is a positive integer; for example, a value of N may be 1, 2, 4, 6, 8, 16, 32, 64, and so on.

It can be known from studying the precoding matrix w, the precoding matrix W may match an actually deployed antenna configuration; because granularity of a value of θ is π/16, more precise space quantization can be implemented, and feedback precision of CSI can be improved; besides, two columns of the precoding matrix w are orthogonal to each other, and interference between layers can be reduced.

Figure 2:
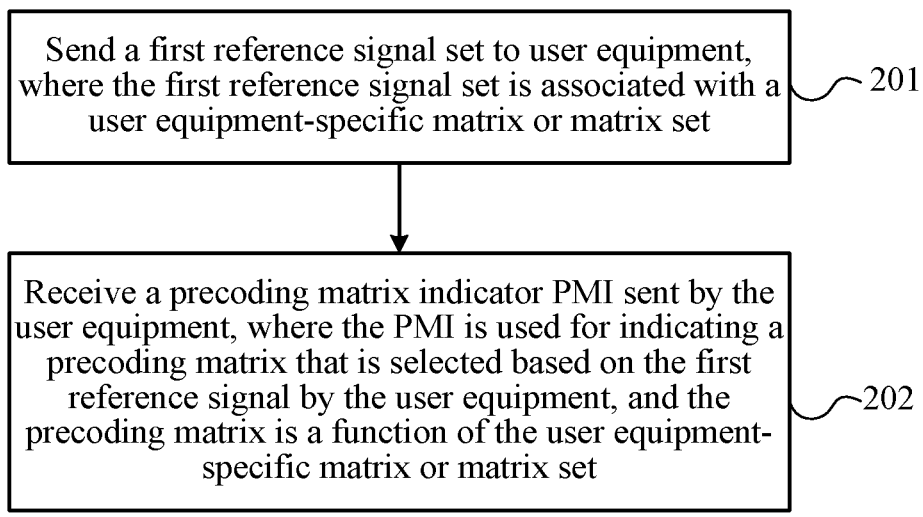
FIG. 2 is a flowchart of a method for determining a precoding matrix indicator according to another embodiment of the present invention.

FIG. 2 is a flowchart of a method for determining a precoding matrix indicator according to another embodiment of the present invention. The method in FIG. 2 is executed by a base station (for example, eNB).

201: Send a first reference signal set to user equipment, where the first reference signal set is associated with a user equipment-specific (UE-specific) matrix or matrix set.

202: Receive a precoding matrix indicator PMI sent by the user equipment, where the PMI is used for indicating a precoding matrix that is selected based on the first reference signal by the user equipment, and the precoding matrix is a function of the user equipment-specific matrix or matrix set.

In this embodiment of the present invention, a first reference signal set is associated with a subset of a user equipment-specific matrix or matrix set, a precoding matrix is a function of the user equipment-specific matrix or matrix set, so that user equipment can select, based on the subset of the matrix or matrix set, the precoding matrix and feed back a PMI, and a set of the precoding matrix forms a user equipment-specific codebook but not a cell specific codebook or system specific codebook. The cell specific codebook or system specific codebook is a precoding matrix set designed for all users in a cell or a system, while the user equipment-specific codebook is a subset of the cell specific codebook or system specific codebook. Therefore, in this embodiment of the present invention, CSI feedback precision can be improved without excessively increasing feedback overhead, thereby improving system performance.

Optionally, the precoding matrix may also be obtained according to the received PMI.

Optionally, as an embodiment, the user equipment-specific matrix or matrix set is notified by the base station to the user equipment.

Optionally, as another embodiment, before step 201, the base station may further send a second reference signal set to the user equipment, where the second reference signal set is associated with a matrix or matrix set. Then, the base station receives a second index that is determined based on the second reference signal set by the user equipment. The second index is used for indicating an antenna port or antenna port subset selected by the user equipment, or a matrix or matrix set that is associated with the antenna port or antenna port subset selected by the user equipment.

Optionally, the first reference signal set is a subset of the second reference signal set.

Optionally, as another embodiment, when sending the second reference signal set to the user equipment, the base station may send reference signals of the second reference signal set to the user equipment at different times.

Optionally, the matrix or matrix set associated with the second reference signal set is cell specific or system specific.

Optionally, as an embodiment, before step 201, the base station may further measure an uplink physical channel or an uplink physical signal, to obtain channel estimation of the user equipment according to channel reciprocity. Based on a predefined criterion, the first reference signal and the user equipment-specific matrix or matrix set are selected for a user. The uplink physical channel may be a physical uplink control channel (Physical Uplink Control Channel, PUCCH for short) or a physical uplink shared channel (Physical Uplink Shared Channel, PUSCH for short); the physical signal may be a sounding reference signal (Sounding Reference Signal, SRS for short) or another uplink demodulation reference signal (DeModulation Reference signal, DMRS for short).

Optionally, as another embodiment, the first reference signal set may include one or more reference signal subsets. The reference signal subset corresponds to a co-polarized antenna port subset, or corresponds to an antenna port subset that is arranged in a same direction in an antenna port array, or corresponds to a quasi-co-location antenna port subset.

Optionally, as another embodiment, in step 201, the base station may send subsets of the first reference signal set to the user equipment at different times. Here, different times may be associated with a same matrix or different matrices separately, or may be associated with a same subset or different subsets of a matrix set separately.

Optionally, as another embodiment, the precoding matrix w is a product of two matrices $W_1$ and $W_2$, $W=W_1W_2$, where the matrix $W_1$ is a block diagonal matrix, the block diagonal matrix includes at least one block matrix, and each block matrix is a function of the user equipment-specific matrix or matrix set.

Optionally, the matrix $W_2$ is used to select or perform weighted combination on column vectors in the matrix $W_1$, so as to form the matrix w.

Optionally, as another embodiment, each block matrix X is a kronecker product of two matrices c and D, $X=C\otimes D$. At least one matrix in the two matrices C and D is a function of the user equipment-specific matrix or matrix set.

Optionally, as another embodiment, columns of at least one matrix in the two matrices C and D are rotations of column vectors in a matrix in the user equipment-specific matrix or matrix set, that is, a $k^{th}$ column vector $c_k$ of the matrix C is shown in the expression (2) or (3); or, an $l^{th}$ column vector $d_l$ of the matrix D is shown in the expression (4) or (5), where $N_V$, $N_H$, $N_C$, and $N_D$ are positive integers, $a_m$ is an $m^{th}$ column vector of a matrix A, and the matrix A is a matrix in the user equipment-specific matrix or matrix set.

It should be noted that, that column vectors of the matrix C or matrix D that corresponds to the block matrix X at a different location on a diagonal in $W_1$ satisfy the expressions (2) to (5) does not mean that the block matrix X at a different location on a diagonal in $W_1$ has a same matrix C or matrix D; in contrast, the block matrix X at a different location may have a same or different matrix C or matrix D.

Optionally, as another embodiment, a matrix in the user equipment-specific matrix or matrix set is a matrix formed by columns being DFT vectors, or a matrix formed by column vectors of a Hadamard matrix or a Householder matrix.

Optionally, as another embodiment, the DFT vector $a_l$ is shown in the expression (6), where $N_C \geq N$ or $N_d \geq N$.

Optionally, as another embodiment, the first reference signal set includes at least one reference signal subset, and the reference signal subset is associated with a set of the matrix C or the matrix D.

Optionally, as another embodiment, the reference signal subset has a sending period longer than that of another reference signal.

As an embodiment of the present invention, the precoding matrix W may be the following matrix:

$$(2M)^{-\frac{1}{2}}[1 \quad e^{j\theta} \quad \ldots \quad e^{j(M-1)\theta} \quad e^{j\varphi} \quad e^{j(\varphi+\theta)} \quad \ldots \quad e^{j(\varphi+(M-1)\theta)}]^T$$

or, $$(4M)^{-\frac{1}{2}}\begin{bmatrix} [1 \quad e^{j\theta} \quad \ldots \quad e^{j(M-1)\theta} \quad e^{j\phi} \quad e^{j(\phi+\theta)} \quad \ldots \quad e^{j(\phi+(M-1)\theta)}]^T \\ e^{j\varphi}[1 \quad e^{j\theta} \quad \ldots \quad e^{j(M-1)\theta} \quad e^{j\phi} \quad e^{j(\phi+\theta)} \quad \ldots \quad e^{j(\phi+(M-1)\theta)}]^T \end{bmatrix}$$

or, $$(2NM)^{-\frac{1}{2}}\begin{bmatrix} \begin{bmatrix} [1 \quad e^{j\theta} \quad \ldots \quad e^{j(M-1)\theta}]^T \\ e^{j\phi}[1 \quad e^{j\theta} \quad \ldots \quad e^{j(M-1)\theta}]^T \\ \ldots \\ e^{j(N-1)\phi}[1 \quad e^{j\theta} \quad \ldots \quad e^{j(M-1)\theta}]^T \end{bmatrix} \\ e^{j\varphi}\begin{bmatrix} [1 \quad e^{j\theta} \quad \ldots \quad e^{j(M-1)\theta}]^T \\ e^{j\phi}[1 \quad e^{j\theta} \quad \ldots \quad e^{j(M-1)\theta}]^T \\ \ldots \\ e^{j(N-1)\phi}[1 \quad e^{j\theta} \quad \ldots \quad e^{j(M-1)\theta}]^T \end{bmatrix} \end{bmatrix}$$

where $\varphi=0,\pi,2\pi,3\pi/2,\ldots$, $$\theta = \frac{\pi}{16}(2i_1 + \lfloor i_2/4 \rfloor),$$

$i_1=0,\ldots,15$, $i_2=0,\ldots,15$, and a symbol "$\lfloor x \rfloor$" represents a maximum integer that is not greater than x.

$$\phi = \frac{k\pi}{32},$$

$k=0,\ldots,15,\ldots,32$, and so on, or $k=0,\pm 1,\ldots,\pm 15,\pm 16$, and so on.

M is a positive integer; for example, a value of M may be 1, 2, 4, 6, 8, 16, 32, 64, and so on. N is a positive integer; for example, a value of N may be 1, 2, 4, 6, 8, 16, 32, 64, and so on.

As another embodiment of the present invention, the precoding matrix w may be the following matrix:

$$(4NM)^{-\frac{1}{2}}\begin{bmatrix}\begin{bmatrix}[1\ e^{j\theta}\ \dots\ e^{j(M-1)\theta}]^T & [1\ e^{j\theta}\ \dots\ e^{j(M-1)\theta}]^T \\ e^{j\phi}[1\ e^{j\theta}\ \dots\ e^{j(M-1)\theta}]^T & e^{j\phi}[1\ e^{j\theta}\ \dots\ e^{j(M-1)\theta}]^T \\ \dots & \dots \\ e^{j(N-1)\phi}[1\ e^{j\theta}\ \dots\ e^{j(M-1)\theta}]^T & e^{j(N-1)\phi}[1\ e^{j\theta}\ \dots\ e^{j(M-1)\theta}]^T\end{bmatrix} \\ \begin{bmatrix}[1\ e^{j\theta}\ \dots\ e^{j(M-1)\theta}]^T & -[1\ e^{j\theta}\ \dots\ e^{j(M-1)\theta}]^T \\ e^{j\phi}[1\ e^{j\theta}\ \dots\ e^{j(M-1)\theta}]^T & -e^{j\phi}[1\ e^{j\theta}\ \dots\ e^{j(M-1)\theta}]^T \\ \dots & \dots \\ e^{j(N-1)\phi}[1\ e^{j\theta}\ \dots\ e^{j(M-1)\theta}]^T & -e^{j(N-1)\phi}[1\ e^{j\theta}\ \dots\ e^{j(M-1)\theta}]^T\end{bmatrix}\end{bmatrix}$$

or $$(4NM)^{-\frac{1}{2}}\begin{bmatrix}\begin{bmatrix}[1\ e^{j\theta}\ \dots\ e^{j(M-1)\theta}]^T & [1\ e^{j\theta}\ \dots\ e^{j(M-1)\theta}]^T \\ e^{j\phi}[1\ e^{j\theta}\ \dots\ e^{j(M-1)\theta}]^T & e^{j\phi}[1\ e^{j\theta}\ \dots\ e^{j(M-1)\theta}]^T \\ \dots & \dots \\ e^{j(N-1)\phi}[1\ e^{j\theta}\ \dots\ e^{j(M-1)\theta}]^T & e^{j(N-1)\phi}[1\ e^{j\theta}\ \dots\ e^{j(M-1)\theta}]^T\end{bmatrix} \\ \begin{bmatrix}j[1\ e^{j\theta}\ \dots\ e^{j(M-1)\theta}]^T & -j[1\ e^{j\theta}\ \dots\ e^{j(M-1)\theta}]^T \\ je^{j\phi}[1\ e^{j\theta}\ \dots\ e^{j(M-1)\theta}]^T & -je^{j\phi}[1\ e^{j\theta}\ \dots\ e^{j(M-1)\theta}]^T \\ \dots & \dots \\ je^{j(N-1)\phi}[1\ e^{j\theta}\ \dots\ e^{j(M-1)\theta}]^T & -je^{j(N-1)\phi}[1\ e^{j\theta}\ \dots\ e^{j(M-1)\theta}]^T\end{bmatrix}\end{bmatrix}$$

where $$\theta = \frac{\pi}{16}(2i_1 + \lfloor i_2/4 \rfloor),$$

$i_1=0, \dots, 15$, $i_2=0, \dots, 15$, and a symbol "$\lfloor x \rfloor$" represents a maximum integer that is not greater than x.

$$\phi = \frac{k\pi}{32},$$

k=0, ..., 15, ..., 32, and so on, or k=0, ±1, ..., ±15, ±16, and so on.

M is a positive integer; for example, a value of M may be 1, 2, 4, 6, 8, 16, 32, 64, and so on. N is a positive integer; for example, a value of N may be 1, 2, 4, 6, 8, 16, 32, 64, and so on.

It can be known from studying the precoding matrix w, the precoding matrix w may match an actually deployed antenna configuration; because granularity of a value of θ is π/16, more precise space quantization can be implemented, and feedback precision of CSI can be improved; besides, two columns of the precoding matrix W are orthogonal to each other, and interference between layers can be reduced.

The embodiments of the present invention are described below in more detail with reference to specific examples. In embodiments described below, an eNB is used as an example of a base station, and UE is used as an example of user equipment, but the embodiments of the present invention are not limited thereto, and may also be applied to other communications systems.

Figure 3:
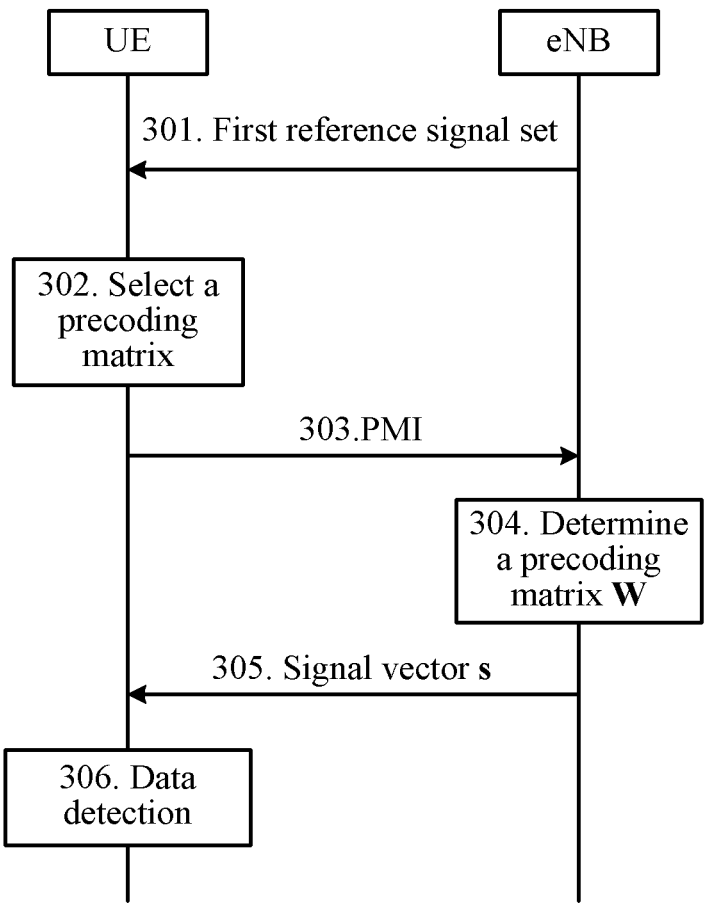
FIG. 3 is a schematic flowchart of a multi-antenna transmission method according to an embodiment of the present invention.

FIG. 3 is a schematic flowchart of a multi-antenna transmission method according to an embodiment of the present invention.

301: UE receives a first reference signal set, where the first reference signal set is associated with a user equipment-specific (UE-specific) matrix or matrix set.

Specifically, the first reference signal set received by the UE is notified by an eNB by using higher layer signaling, or is dynamically notified by an eNB by using a downlink control channel. The reference signal may be a cell specific reference signal (CRS, Cell specific RS), or a demodulation reference signal (DMRS, DeModulation RS), or a channel state information reference signal (CSI-RS, channel state information RS). The reference signal may correspond to a physical antenna, or may also correspond to a virtual antenna, where the virtual antenna is a weighted combination of multiple physical antennas.

The first reference signal set may include one or more reference signal subsets.

Specifically, for example, the first reference signal set received by the UE is P, which includes in total eight reference signals, namely, p1, p2, p3, ..., p7, and p8. The first reference signal set may include one reference signal subset. In this case, the reference signal subset is the same as the first reference signal set, that is, the eight reference signals p1, p2, and p8 in P.

Alternatively, the first reference signal set may include multiple reference signal subsets. For example, the first reference signal set is P, and includes two reference signal subsets P1 and P2, where P1={p1, p2, p3, p4}, and P2={s5, s6, s7, s8}.

Further, the reference signal subset included in the first reference signal set may correspond to a co-polarized antenna port subset. For example, the subset P1={p1, p2, p3, p4} of the first reference signal set corresponds to a co-polarized antenna port subset; and the subset P2={p5, p6, p7, p8} of the first reference signal set corresponds to another co-polarized antenna port subset.

Optionally, as another embodiment, the reference signal subset included in the first reference signal set may correspond to a port subset that is arranged in a same direction in an antenna port array. For example, the subset P1={p1, p2, p3, p4} of the first reference signal set corresponds to an antenna port subset of a column in a vertical direction in the antenna port array. The subset P2={p5, p6, p7, p8} of the first reference signal set corresponds to an antenna port subset of a row in a horizontal direction in the antenna port array. Alternatively, P1={p1, p2, p3, p4} and P2={p5, p6, p7, p8} correspond to antenna port subsets of two different rows in the antenna port array separately. Alternatively, P1={p1, p2, p3, p4} and P2={p5, p6, p7, p8} correspond to antenna port subsets of two different columns in the antenna port array separately.

Optionally, as another embodiment, the reference signal subset included in the first reference signal set may correspond to a quasi-co-location antenna port subset. For example, the subset P1={p1, p2, p3, p4} of the first reference signal set corresponds to a quasi-co-location antenna port subset. The subset P2={p5, p6, p7, p8} of the first reference signal set corresponds to an antenna port subset that is located at another quasi-co-location. It should be noted that the quasi-co-location (QCL, Quasi-Co-Location) antenna port refers to that a distance between antennas corresponding to the antenna port is within a range that uses a wavelength as a dimension.

It should be noted that each of the foregoing antenna ports corresponds to a physical antenna or virtual antenna, where the virtual antenna is a weighted combination of multiple physical antennas or antenna array elements.

Further, reference signals in the multiple reference signal subsets included in the first reference signal set may occupy different symbol/frequency/sequence resources and be transmitted at a same subframe, or may occupy a same symbol/frequency/sequence resource and be transmitted at different subframes.

The foregoing division of the reference signal subset may further reduce complexity of implementation.

Specifically, the first reference signal set is associated with a subset of a user equipment-specific (UE-specific) matrix or matrix set; or each reference signal in the first reference signal set may be associated with a subset of a user equipment-specific (UE-specific) matrix or matrix set. For example, the reference signal set notified by the eNB is S, which includes in total eight reference signals, namely s1, s2, s3, s7, and s8. The foregoing reference signals are associated with matrices w1, w2, . . . , and w8 separately, or are associated with {w1,w2}, {w2,w3}, {w7,w8}, and {w8, w1} separately.

The first reference signal set is associated with a subset of a matrix or matrix set, or a reference signal subset of the first reference signal set may be associated with a subset of a user equipment-specific matrix or matrix set. For example, the reference signal set notified by the eNB is S, which includes in total eight reference signals, namely s1, s2, s3, s7, and s8. A reference signal subset {s1, s2, s3, s4} is associated with a matrix p1 or a matrix subset {p1, . . . , pm}, and a reference signal subset {s5, s6, s7, s8} is associated with a matrix w1 or a matrix subset {w1, wn}, where m and n are positive integers. Alternatively, reference signal subsets {s1, s2}, {s3, s4}, . . . , and {s7, s8} are associated with matrices w1, w2, w3, and w4 respectively. Alternatively, reference signal subsets {s1, s2}, {s3, s4}, . . . , and {s7, s8} are associated with matrices {w1, w2}, {w3, w4}, . . . , and {w7, w8} respectively. The matrix herein includes a vector.

Further, an association or a correspondence between the first reference signal set and a user equipment-specific matrix or matrix set may be indicated by using signaling. For example, it is indicated by using higher layer signaling, for example, radio resource control (RRC, Radio Resource Control) signaling, that the reference signal subset {s1, s2, s3, s4} is associated with a matrix p1 or a matrix subset {p1, . . . , pm}, and the reference signal subset {s5, s6, s7, s8} is associated with a matrix w1 or a matrix subset {w1, . . . , wn}. Alternatively, the association or correspondence between the first reference signal set and a user equipment-specific matrix or matrix set is dynamically indicated by using downlink control information (DCI, Downlink Control information). Alternatively, multiple candidate association relationships are indicated by using higher layer signaling, for example RRC signaling, and one of the candidate association relationships is further dynamically indicated by using DCI. Specifically, each matrix subset in the signaling may be represented by a bitmap (bitmap). The RRC signaling may be UE-specific signaling, for example, dedicated physical signaling. Besides, the first reference signal set and indication information of the UE-specific matrix or matrix set may be sent in same RRC dedicated signaling.

Optionally, as another embodiment, an association relationship or mapping between the first reference signal set and a user equipment-specific matrix or matrix set may also be predefined. For example, it is predefined and known by both the user equipment and the base station that the reference signal subset {s1, s2, s3, s4} is associated with a matrix p1 or a matrix subset {p1, . . . , pm}, and the reference signal subset {s5, s6, s7, s8} is associated with a matrix w1 or a matrix subset {w1, . . . , wn}.

Specifically, the first reference signal set is associated with a subset of a matrix or matrix set, or the first reference signal set may be associated with a matrix or matrix set, where a subset of the matrix or matrix set is notified by using signaling or is predefined. For example, a matrix or matrix subset is notified by using higher layer signaling, for example, RRC signaling, or is dynamically notified by using DCI; or, a matrix set is notified by using higher layer signaling, for example, RRC signaling, and one matrix subset in the matrix set is further dynamically notified by using DCI.

Specifically, a matrix A in a subset of the matrix or matrix set that is associated with the first reference signal set may be a matrix formed by columns being DFT vectors, that is, $$A = [a_0 \, a_1 \, \ldots \, a_{N_a-1}], \tag{7}$$

where, $$a_k \in \{f_0, f_1, \ldots, f_{N_f-1}\}, k = 0, \ldots, N_a-1 \tag{8}$$

where $N_a \geq 1$ is a quantity of columns of the matrix A, and $N_f \geq 1$ is a quantity of columns of the DFT vectors; $f_n$, $n = 0, \ldots, N_f-1$ is the DFT vectors, that is, $f_n$ is represented as:

$$f_n = \left[ e^{j\frac{2\pi \cdot 0 \cdot n}{N}} \quad e^{j\frac{2\pi \cdot 1 \cdot n}{N}} \quad \ldots \quad e^{j\frac{2\pi \cdot (M-1) \cdot n}{N}} \right]^T \tag{9}$$

where both M and N are integers; for example, for M=N=4, there is:

$$[f_0 \quad f_1 \quad f_2 \quad f_3] = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix} \tag{10}$$

Specifically, a matrix A in the user equipment-specific (UE specific) matrix or matrix set may also be a matrix formed by column vectors of a Hadamard matrix, that is $$A=[a_0 a_1 \ldots a_{N_a-1}], \quad (11)$$

where, $$a_k \in \{h_0, h_1, \ldots, h_{N_b-1}\}, k=0, \ldots, N_a-1 \quad (12)$$

where $N_a \geq 1$ is a quantity of columns of the matrix A, $N_h \geq 1$ is a quantity of columns of the Hadamard matrix, and $h_m$, $m=0, \ldots, N_h-1$ is column vectors of the Hadamard matrix, for example, $$[h_0 \; h_1 \; h_2 \; h_3] = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad (13)$$

Further, the user equipment-specific (UE specific) matrix set may include at least two matrices, where one matrix is the matrix A described above, and the other matrix is a matrix B formed by columns being DFT vectors, or by column vectors of a Hadamard matrix, that is, $$B=[b_0 b_1 \ldots b_{N_b-1}], \quad (14)$$

where, $$b_k \in \{f'_0, f'_1, \ldots, f'_{N_f-1}\}, k=0, \ldots, N_b-1 \quad (15)$$

or $$b_k \in \{h'_0, h'_1, \ldots, h'_{N'_b-1}\}, k=0, \ldots, N_b-1 \quad (16)$$

where $N_b \geq 1$ is a quantity of columns of the matrix B, $N'_h \geq 1$ and $N'_f \geq 1$ are a quantity of columns of the Hadamard matrix and a quantity of columns of the DFT vectors respectively; $h'_m$ is a column vector of the Hadamard matrix; $f'_n$ is the DFT vectors, that is, $f'_n$ is represented as:

$$f'_n = \left[ e^{j\frac{2\pi \cdot 0 \cdot n}{N'}} \; e^{j\frac{2\pi \cdot 1 \cdot n}{N'}} \; \ldots \; e^{j\frac{2\pi \cdot (M'-1) \cdot n}{N'}} \right]^T \quad (17)$$

where M',N' are both integers; in this case, the first reference signal set may be divided into two subsets, which are separately associated with the matrix A and the matrix B or a subset formed by the matrix A and a subset formed by the matrix B.

Alternatively, one matrix in the user equipment-specific (UE specific) matrix or the matrix set may also be a matrix Y in the following form:

$$Y=A \otimes B \quad (18)$$

where A and B may have the foregoing structures shown in the expressions (8) to (13) and the expressions (14) to (17) respectively.

Besides, the matrix in the user equipment-specific (UE specific) matrix or the matrix set may also use a matrix in another form, for example, a Householder matrix, or a precoding matrix in an LTE R8 4-antenna or LTE R10 8-antenna codebook.

One matrix in the user equipment-specific (UE specific) matrix or the matrix set may have the following structure:

$$W=W_1 W_2 \quad (19)$$

where a matrix $W_1$ is a block diagonal matrix, for example, $$W_1 = \text{diag}\{X_1, X_2\} \quad (20)$$

where each block matrix in the matrix $W_1$ is a function of the matrices A and B or a function of a matrix Y, for example, $$X_i = \text{diag}\{\rho_0, \rho_1, \ldots\} A \otimes B, \; i=1,2, \quad (21)$$

or $$X_i = \text{diag}\{\rho_0, \rho_1, \ldots\} Y, \; i=1,2, \quad (22)$$

where $\rho_0, \rho_1, \ldots$, are scalars; for example, $\rho_0 = \rho_1 = \ldots, =1$.

Optionally, as another embodiment, each block matrix in the matrix $W_1$ may be represented as a kronecker product of two matrices, for example, $$X_i = C_i \otimes D_i, \; i=1,2, \quad (23)$$

where $\otimes$ represents a matrix kronecker product, and a matrix $C_i$ or $D_i$ satisfies the following relationship:

A $k^{th}$ column $c_i$ of the matrix $C_i$ satisfies:

$$c_k = \text{diag}\{1, e^{j2\pi/N_C}, \ldots, e^{j2\pi N_V/N_C}\} a_m \quad (24)$$

or $$c_k = \text{diag}\{1, e^{j2\pi/N_C}, \ldots, e^{j2\pi(N_V/2-1)/N_C}, e^{j\theta}, e^{j\theta} e^{j2\pi/N_C}, \ldots, e^{j\theta} e^{j2\pi(N_V/2-1)/N_C}\} a_m \quad (25)$$

or; an $l^{th}$ column $d_l$ of $D_i$ satisfies:

$$d_l = \text{diag}\{1, e^{j2\pi/N_D}, \ldots, e^{j2\pi N_H/N_D}\} b_n \quad (26)$$

or $$d_l = \text{diag}\{1, e^{j2\pi/N_D}, \ldots, e^{j2\pi(N_H/2-1)/N_D}, e^{j\phi}, e^{j\phi} e^{j2\pi/N_D}, \ldots, e^{j\phi} e^{j2\pi(N_H/2-1)/N_D}\} b_n \quad (27)$$

where $N_V$, $N_H$, $N_C$, and $N_D$ are all positive integers, vectors $a_l$ and $b_l$ are columns of the matrix A and the matrix B respectively, and $\theta$ and $\phi$ are phase shifts whose values may be $0, \pi, \pm\pi/2, \pm\pi/4, \pm\pi/8$, and so on.

It should be noted that a value of $N_C$ or $N_D$ may be infinite, and therefore $2\pi/N_C=0$ or $2\pi/N_D=0$, and in this case, $c_k=a_m$, $c_k=\text{diag}\{1,1,\ldots,1,e^{j\theta},e^{j\theta},\ldots,e^{j\theta}\}a_m$, $d_l=a_m$, or $d_l=\text{diag}\{1,1,\ldots,1,e^{j\phi},e^{j\phi},\ldots,e^{j\phi}\}a_m$.

Further, vectors $c_k$ and $d_k$ in the expressions (24) to (27) may have granularity finer than that of $a_l$ and $b_l$ respectively, that is, $$N_C \geq N \text{ or } N_D \geq N' \quad (28)$$

Further, a set formed by the foregoing vector or matrix A or B or Y or W is $C_A$ or $C_B$ or $C_Y$ or $C_W$, and may be further divided into multiple subsets (the subset may include only one element), and each subset may be associated with or have a mapping relationship with a user equipment identifier. For example, a subset $C_A^{(1)}$ in $C_A$ is associated with or is mapped to a user equipment identifier $ID_1$, and another subset $C_A^{(2)}$ in $C_A$ is associated with or is mapped to a user equipment identifier $ID_2$. The subsets $C_A^{(1)}$ and $C_A^{(2)}$ may intersect, or may not intersect. An association or a mapping relationship between the foregoing vector or matrix or subset of the matrix with the user equipment identifier may be predefined, or may also be notified by the eNB to the UE, for example, notified by using higher layer signaling, for example, RRC signaling or a downlink control channel Each subset may include only one element. Alternatively, the reference signal set may be associated with a user equipment identifier. For example, the reference signal set notified by the eNB is S, which includes in total eight reference signals, namely s1, s2, s3, s7, and s8. The foregoing reference signal set is associated with a user equipment identifier $ID_0$; or the reference signal set received by the UE may be divided into two or more subsets, and the subsets are associated with specific user equipment identifiers separately. For example, the reference signal set received by the UE may be divided into two subsets, one including reference signals s1, s2, s3, and s4 and the other s5, s6, s7, and s8, and then s1, s2, s3, and s4 are associated with identifiers user equipment $ID_1$ and $ID_2$. An association or a mapping relationship between the reference signal set and a user equipment identifier may be predefined, or may also be notified by the eNB.

It should be noted that the user equipment identifier is not necessarily a UE ID in a specific communications protocol, for example, LTE, but may also be a specific parameter that is used to distinguish a user equipment attribute, for example, an index or an offset in a user group or a UE group, or simply an index or an offset used in a same user group or UE group. The offset or index facilitates implementation of distinguishing of attributes related to different beams among user equipments or user groups.

Further, reference signals in the reference signal set may be sent at different times, for example, different subframes, and the different times may be associated with or mapped to different vectors/matrices or different subsets of matrix sets. The different vectors/matrices or different subsets of matrix sets that the reference signals are associated with or mapped to at different times may be predefined, or may also be notified by the eNB, for example, notified by using RRC signaling.

302: The UE selects a precoding matrix based on the first reference signal set, where the precoding matrix is a function of the user equipment-specific matrix or matrix set.

Specifically, that the precoding matrix is a function of the user equipment-specific matrix or matrix set includes that:

the precoding matrix is a product of two matrices $W_1$ and $W_2$ that is, $$W = W_1 W_2 \tag{29}$$

where the matrix $W_1$ is a function of a matrix A or B, and the matrix A or B is a matrix in the user equipment-specific matrix or matrix set; for example, $W_1$ is the matrix A or the matrix B;

or, the matrix $W_1$ is a block diagonal matrix, the block diagonal matrix includes at least one block matrix, and each block matrix is a function of the matrix A or B, for example, $$W_1 = \text{diag}\{X_1, X_2\} \tag{30}$$

where each block matrix in the matrix $W_1$ is a function of the matrix A or the matrix B, for example, $$X_i = A, \; i=1,2 \tag{31}$$

or, $$X_i = \text{diag}\{\rho_0, \rho_1, \ldots,\} A, \; i=1,2 \tag{32}$$

where $\rho_0, \rho_1, \ldots,$ are scalars, or may also be nonnegative real numbers, or may also be complex numbers, or, $$X_i = C_i \otimes D_i, \; i=1,2 \tag{33}$$

where $\otimes$ represents a kronecker product of two matrices, where a $k^{th}$ column $c_i$ of the matrix $C_i$ or an $l^{th}$ column $d_l$ of $D_i$ satisfies the following relationship:

$$c_k = \text{diag}\{1, e^{j2\pi/N_C}, \ldots, e^{j2\pi N_V/N_C}\} a_m \tag{34}$$

or, $$c_k = \text{diag}\{1, e^{j2\pi/N_C}, \ldots, e^{j2\pi(N_V/2-1)/N_C}, e^{j\theta}, e^{j\theta} e^{j2\pi/N_C}, \ldots, e^{j2\pi(N_V/2-1)/N_C}\} a_m \tag{35}$$

or, $$d_l = \text{diag}\{1, e^{j2\pi/N_D}, \ldots, e^{j2\pi N_H/N_D}\} b_n \tag{36}$$

or, $$d_l = \text{diag}\{1, e^{j2\pi/N_D}, \ldots, e^{j2\pi(N_H/2-1)/N_D}, e^{j\phi}, e^{j\phi} e^{j2\pi/N_D}, \ldots, e^{j\phi} e^{j2\pi(N_H/2-1)/N_D}\} b_n \tag{37}$$

where $N_V$, $N_H$, $N_C$, and $N_D$ are all positive integers, a vector $a_m$ and a vector $b_n$ are an $m^{th}$ column vector of the matrix A and an $n^{th}$ column vector of the matrix B respectively, $\theta$ and $\phi$ are phase shifts whose values may be $0, \pi, \pm\pi/2, \pm\pi/4, \pm\pm\pi/8$, and so on.

It should be noted that a value of $N_C$ or $N_D$ may be infinite, and therefore $2\pi/N_C=0$ or $2\pi/N_D=0$ and in this case, $c_k=a_m$, $c_k=\text{diag}\{1,1,\ldots,1,e^{j\theta}j^\theta,\ldots,e^{j\theta}\}a_m$, $d_l=b_n$, or $d_l=\text{diag}\{1,1,\ldots,1,e^{j\phi},e^{j\phi},\ldots,e^{j\phi}\}b_n$.

At least one of the matrix A or the matrix B is a matrix in the user equipment-specific matrix or matrix set.

In this case, a column vector in the matrix $W_2$ may have a structure $y_n = [e_n^T \; e^{j\theta_n} e_n^T]^T$, where $e_n$ represents a selection vector, in which except that an $n^{th}$ element is 1, the rest elements are all 0, and $\theta_n$ is a phase shift. In an example, the block matrices $X_1$ and $X_2$ each have 4 columns, and the matrix $W_2$ may be represented as:

$$W_2 \in \left\{ \frac{1}{\sqrt{2}}\begin{bmatrix}Y\\Y\end{bmatrix}, \frac{1}{\sqrt{2}}\begin{bmatrix}Y\\jY\end{bmatrix}, \frac{1}{\sqrt{2}}\begin{bmatrix}Y\\-Y\end{bmatrix}, \frac{1}{\sqrt{2}}\begin{bmatrix}Y\\-jY\end{bmatrix} \right\} \tag{38}$$

$$Y \in \{\tilde{e}_1, \tilde{e}_2, \tilde{e}_3, \tilde{e}_4\} \tag{39}$$

or, $$W_2 \in \left\{ \frac{1}{\sqrt{2}}\begin{bmatrix}Y_1 & Y_2\\Y_1 & -Y_2\end{bmatrix}, \frac{1}{\sqrt{2}}\begin{bmatrix}Y_1 & Y_2\\jY_1 & -jY_2\end{bmatrix} \right\} \tag{40}$$

$$(Y_1, Y_2) \in \{(\tilde{e}_1, \tilde{e}_1), (\tilde{e}_2, \tilde{e}_2), (\tilde{e}_3, \tilde{e}_3), \\ (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\} \tag{41}$$

where $\tilde{e}_n$, $n=1, 2, 3, 4$ represents a selection vector of $4\times1$, in which except that an $n^{th}$ element of the vector is 1, the rest elements of the vector are all 0.

In an example, the block matrices $X_1$ and $X_2$ each have 8 columns, and the matrix $W_2$ may be represented as:

$$W_2 \in \left\{ \frac{1}{\sqrt{2}}\begin{bmatrix}Y\\Y\end{bmatrix}, \frac{1}{\sqrt{2}}\begin{bmatrix}Y\\jY\end{bmatrix}, \frac{1}{\sqrt{2}}\begin{bmatrix}Y\\-Y\end{bmatrix}, \frac{1}{\sqrt{2}}\begin{bmatrix}Y\\-jY\end{bmatrix} \right\} \tag{42}$$

$$Y \in \{e_1, e_2, e_3, e_4, e_5, e_6, e_7, e_8\} \tag{43}$$

or, $$W_2 \in \left\{ \frac{1}{\sqrt{2}}\begin{bmatrix}Y_1 & Y_2\\Y_1 & -Y_2\end{bmatrix}, \frac{1}{\sqrt{2}}\begin{bmatrix}Y_1 & Y_2\\jY_1 & -jY_2\end{bmatrix} \right\} \tag{44}$$

$$(Y_1, Y_2) \in \{(e_1, e_1), (e_2, e_2), (e_3, e_3), \\ (e_4, e_4), (e_1, e_2), (e_2, e_3), (e_1, e_4), (e_2, e_4)\} \tag{45}$$

where $e_n$, $n=1, 2, \ldots, 8$ represents a selection vector of 8×1, in which except that an $n^{th}$ element of the vector is 1, the rest elements of the vector are all 0.

Alternatively,

The block diagonal matrix $W_1$ includes only one block matrix, that is, $W_1=X$, and the block matrix X is a function of the matrix A or B. For example, the block matrix X is a kronecker product of two matrices A and B, that is, $$X = A \otimes B \quad (46)$$

where the matrix A or the matrix B is a matrix in the user equipment-specific (UE-specific) matrix or matrix set;

or, the block matrix X is a Kronecker (kronecker) product of two matrices C and D, $X=C \otimes D$. At least one matrix in the two matrices C and D is a function of the matrix A or B. For example, Columns of at least one matrix in the matrices C and D are rotations of column vectors in the matrix A or B, that is, a $k^{th}$ column vector $c_k$ of the matrix C is:

$$c_k = \text{diag}\{1, e^{j2\pi/N_C}, \ldots, e^{j2\pi N_V/N_C}\} a_m, \quad (47)$$

or, $$c_k = \text{diag}\{1, e^{j2\pi/N_C}, \ldots, e^{j2\pi(N_V/2-1)/N_C}, e^{j\theta}, e^{j\theta} e^{j2\pi/N_C}, \ldots, e^{j\theta} e^{j2\pi(N_V/2-1)/N_C}\} a_m, \quad (48)$$

or; an $l^{th}$ column vector $d_l$ of the matrix D is:

$$d_l = \text{diag}\{1, e^{j2\pi/N_D}, \ldots, e^{j2\pi N_H/N_D}\} b_n, \quad (49)$$

or, $$d_l = \text{diag}\{1, E^{j2\pi/N_D}, \ldots, e^{j2\pi(N_H/2-1)/N_D}, e^{j\phi}, e^{j\phi} e^{j2\pi/N_D}, \ldots, e^{j\phi} e^{j2\pi(N_H/2-1)/N_D}\} b_n, \quad (50)$$

where $N_V$, $N_H$, $N_C$, and $N_D$ are all positive integers, a vector $a_m$ and a vector $b_n$ are an $m^{th}$ column vector of the matrix A and an $n^{th}$ column vector of the matrix B respectively, and $\theta_A$ and $\phi_A$ are phase shifts whose values may be $0, \pi, \pm\pi/2, \pm\pi/4, \pm\pi/8$, and so on.

It should be noted that a value of $N_C$ or $N_D$ may be infinite, and therefore $2\pi/N_C=0$ or $2\pi/N_D=0$, and in this case, $c_k=a_m$, $c_k=\text{diag}\{1,1,\ldots,1,e^{j\theta},e^{j\theta},\ldots,e^{j\theta}\}a_m$, $d_l=b_n$, or $d_l=\text{diag}\{1,1,\ldots,1,e^{j\phi},e^{j\phi},\ldots,e^{j\phi}\}b_n$.

Optionally, in this case, the matrix $W_2$ is a column selection matrix, and is used to select r columns from $X=C \otimes D$, where r is a rank of a precoding matrix. For example, $W_2$ may be used to always select first r columns in $X=C \otimes D$, then $$W_2 = [e_1 e_2 \ldots e_r] \quad (51)$$

where $e_i$ represents a unit column vector, in which except that an $i^{th}$ element is 1, the rest elements are all 0.

Further, vectors $c_k$ and $d_k$ in the expressions (47) to (50) may have granularity finer than that of $a_l$ and $b_l$, that is, $$N_D \geq N \text{ or } N_D \geq N \quad (52)$$

303: The UE sends a precoding matrix indicator PMI to the base station, where the PMI corresponds to the selected precoding matrix.

The precoding matrix indicator PMI may include one or more indexes.

Specifically, the precoding matrix indicator PMI may include one index. In this case, the index indicates directly the precoding matrix W. For example, there are in total 16 different precoding matrices, and then an index value $n=0, \ldots, 15$ may be used to indicate the precoding matrix W having a mark number of $0, 1, \ldots 15$ respectively.

Alternatively, the precoding matrix indicator PMI may also be two indexes, for example, $i_1$ and $i_2$. $W_1$ and $W_2$ in the expression (29) are indicated by using $i_1$ and $i_2$ respectively, so that $i_1$ and $i_2$ indicate the precoding matrix w.

Further, the index $i_1$ may be reported based on a subset of $W_1$. For example, a universal set of $W_1$ is Q, and subsets of the set Q are $Q_0, \ldots,$ and $Q_{0,3}$ separately. In this case, the index $i_1$ is used to indicate a matrix $W_1$ in a subset $Q_k$, where $Q_k$ may be one subset in $Q_0, Q_1 \ldots,$ and $Q_3$. Qk may be predefined, or may be determined and reported by the UE, or may also be notified by the eNB to the UE. The subsets Q0, ..., and Q3 may not intersect with each other, that is, an intersection set of the subsets is an empty set; or the subsets Q0, ..., and Q3 may intersect with each other, that is, an intersection set of the subsets is not an empty set.

Alternatively, there may also be three indexes reported by the UE and used to indicate the precoding matrix, for example, $i_3$, $i_4$, and $i_5$. $X_1$ and $X_2$ in the expression (30) are implicitly indicated by using $i_3$ and $i_4$ respectively, and $W_2$ is implicitly indicated by using $i_5$. Therefore, $i_3$, $i_4$, and $i_5$ indicate the precoding matrix W.

Further, the index $i_3$ may be reported based on a subset of $X_1$. For example, a universal set of $X_1$ is R, and subsets of the set R are $R_0, \ldots,$ and $R_7$ separately. In this case, the index $i_3$ is used to indicate a matrix $X_1$ in a subset $R_k$. $R_k$ may be one subset in $R_0, R_1 \ldots,$ and $R_7$. $R_k$ may be predefined, or may be determined and reported by the UE, or may also be notified by the eNB to the UE. The subsets $R_0, \ldots,$ and $R_7$ may not intersect with each other, that is, an intersection set of the subsets is an empty set; or the subsets $R_0, \ldots,$ and $R_7$ may intersect with each other, that is, an intersection set of the subsets is not an empty set; similarly, $i_4$ and $i_5$ may be reported based on subsets of $X_2$ and $W_2$ respectively. The subsets of $X_2$ and $W_2$ may be predefined, or may be determined and reported by the UE, or may also be notified by the eNB to the UE.

Alternatively, indexes reported by the UE and used to indicate the precoding matrix may also be other three indexes, for example, i6, i7 and i8. $C_i$ and $D_i$ in the expression (33) are implicitly indicated by using i6 and i7 respectively, and $W_2$ is implicitly indicated by using i8. Therefore, i6, i7, and i8 indicate the precoding matrix W, and in this case, $C_1=C_2$ and $D_1=D_2$.

Further, the index i6 may be reported based on a subset of $C_i$. For example, a universal set of $C_i$ is O, and subsets of the set O are $O_0, \ldots,$ and $O_7$ separately. In this case, the index $i_6$ is used to indicate a matrix $C_i$ in a subset $O_k$. $O_k$ may be one subset in $O_0, O_1 \ldots,$ and $O_7$. $O_k$ may be predefined, or may also be determined and reported by the UE, or may also be notified by the eNB to the UE. The subsets $O_0, \ldots,$ and $O_7$ may not intersect with each other, that is, an intersection set of the subsets is an empty set; or the subsets $O_0, \ldots, O_7$ may intersect with each other, that is, an intersection set of the subsets is not an empty set; similarly, $i_7$ and $i_8$ may be reported based on subsets of $D_i$ and $W_2$ respectively. The subsets of $D_i$ and $W_2$ may be predefined, or may be determined and reported by the UE, or may also be notified by the eNB to the UE.

Specifically, indexes reported by the UE and used to indicate the precoding matrix may also be four indexes, for example, $i_9$, $i_{10}$, $i_{11}$, and $i_{12}$. $C_1$ and $C_2$ in the expression (33) are implicitly indicated by using $i_9$ and $i_{10}$ respectively, and $D_1=D_2$ and $W_2$ are indicated by using $i_{11}$ and $i_{12}$ respectively. Therefore, $i_9$, $i_{10}$, $i_{11}$, and $i_{12}$ indicate the precoding matrix w.

Further, $i_9$, $i_{10}$, $i_{11}$, and $i_{12}$ may be reported based on subsets of $C_1$, $C_2$, $D_i$, and $W_2$ respectively. The subsets of $C_1$, $C_2$, $D_i$, and $W_2$ may be predefined, or may be determined and reported by the UE, or may also be notified by the eNB to the UE.

Specifically, when the UE selects the precoding matrix and determines a first index based on the first reference signal set, the index value may be calculated based on one reference signal subset. For example, the foregoing index value n is calculated based on the reference signal subset P in step 301, or the index values $i_1$ and $i_2$, or $i_3$, $i_4$, and $i_5$, or $i_6$, $i_7$, and $i_8$, or $i_9$, $i_{10}$, $i_{11}$, and $i_{12}$ are calculated based on the reference signal subset P in step 301.

Alternatively, the index value may be calculated in combination based on multiple reference signal subsets. For example, the index value n is calculated based on the reference signal subsets P1 and P2 in step 301, or the index values $i_1$ and $i_2$, or $i_3$, $i_4$, and $i_5$, or $i_6$, $i_7$, and $i_8$, or $i_9$, $i_{10}$, $i_{11}$, and $i_{12}$ are calculated based on the reference signal subsets P1 and P2 in step 301.

Alternatively, the index values are calculated separately based on multiple reference signal subsets. For example, the index value $i_3$ is calculated based on the reference signal subset P1 in step 301, and the index values $i_4$ and $i_5$ are calculated based on the reference signal subset P2 in step 301. Alternatively, the index value $i_6$ is calculated based on the reference signal subset P1 in step 301, and the index values $i_7$ and $i_8$ are calculated based on the reference signal subset P2 in step 301. Alternatively, the index values $i_9$ and $i_{10}$ are calculated based on the reference signal subset P1 in step 301, and the index values $i_{11}$ and $i_{12}$ are calculated based on the reference signal subset P2 in step 301.

Specifically, the UE may determine the foregoing one or more indexes according to a measured channel state based on a preset criterion, and the preset criterion may be a maximum throughput criterion or a maximum capacity criterion. After the one or more indexes are obtained, the UE may feed back the indexes to the eNB by using a PUCCH or a PUSCH.

Further, the precoding matrix indicator PMI may include one or more indexes, and the UE may report the indexes to the eNB through different subframes by using a physical uplink control channel (PUCCH, Physical Uplink Control Channel).

Further still, the foregoing multiple different indexes may be reported to the eNB through different subframes for different subbands on a frequency domain.

It should be noted particularly that matrices corresponding to the indexes may be single matrices, so that corresponding indexes do not need to be fed back. The single matrix may be a predefined matrix, or may also be notified by a base station by using signaling, or may also be obtained implicitly according to other parameters. For example, $W_2$ is fixedly selected as the matrix shown in the expression (51), so that an index corresponding to $W_2$ does not need to be fed back. In this case, $W_2$ is obtained implicitly according to a rank r of the precoding matrix.

304: The base station obtains the precoding matrix w based on the received precoding matrix indicator PMI.

305: The base station uses the precoding matrix w to transmit a signal vector s.

Specifically, after precoding, a transmitted signal vector is Ws.

306: The UE receives the signal sent by the base station and performs data detection. Specifically, the signal received by the UE is:

$$y=HWs+n$$

where y is a received signal vector, H is a channel matrix obtained through estimation, and n is measured noise and interference.

In this way, a first reference signal set is associated with or corresponds to a user equipment-specific matrix or matrix set, and a precoding matrix is a function of the user equipment-specific matrix or matrix set. Therefore, user equipment can select, based on the user equipment-specific matrix or matrix set, the precoding matrix and feed back a PMI, and a set of the precoding matrix forms a user equipment-specific codebook but not a cell specific codebook or system specific codebook. The cell specific codebook or system specific codebook is a precoding matrix set designed for all users in a cell or a system, while the user equipment-specific codebook is a subset of the cell specific codebook or system specific codebook. Therefore, in this embodiment of the present invention, CSI feedback precision can be improved without excessively increasing feedback overhead, thereby improving system performance.

Besides, a codebook structure $W=W_1W_2$ is used, where $W_1=\text{diag}\{X_1, X_2\}$ and $X_i=C_i\otimes D_i$, i=1, 2, or $W_1=X=C\otimes D$, quantization in a vertical direction and a horizontal direction can be effectively supported, and degrees of freedom at a horizontal and a vertical direction of an active antenna system AAS is fully utilized, so that feedback precision is improved, and MIMO performance, especially MU-MIMO performance, is improved.

Moreover, one or more indexes are fed back based on a subset to indicate a precoding matrix, and correlation between time/frequency domain/space of a channel is fully utilized, so that feedback overhead is greatly reduced.

Further, before step 301 of receiving a first reference signal set sent by a base station, the following optional steps may further be included:

receiving a second reference signal set sent by the base station, where the second reference signal set is associated with a subset of a matrix or matrix set; and determining and reporting, by the UE based on the received second reference signal set, a second index, where the second index is used for indicating an antenna port or antenna port subset, initially selected by the UE, in the second reference signal set, or a subset of a matrix or matrix set that is associated with the antenna port or antenna port subset initially selected by the UE.

The first reference signal set is a subset of the second reference signal set, or the second reference signal set is a superset of the first reference signal set.

Specifically, that the first reference signal set is a subset of the second reference signal set (or equivalently, the second reference signal set is a superset of the first reference signal set) includes that: the second reference signal set is the same as the first reference signal set; or the second reference signal set is a proper subset of the first reference signal set, and in this case, a quantity of reference signals included in the second reference signal set is less than a quantity of reference signals included in the first reference signal set.

Further, the base station uses a reference signal or a reference signal subset corresponding to the antenna port or antenna port subset, initially selected by the UE and indicated by the second index that is reported by the UE, in the second reference signal set, as the first reference signal set; or the base station uses a subset of a matrix or matrix set that is associated with the antenna port or antenna port subset initially selected by the UE and indicated by the second index that is reported by the UE, as a matrix or matrix set that is associated with the first reference signal set.

It should be noted that operation based on the second index by the base station is not limited in this embodiment of the present invention. In other words, the base station may refer to the second index as assistance, but the base station also may not refer to the second index.

Figure 4:
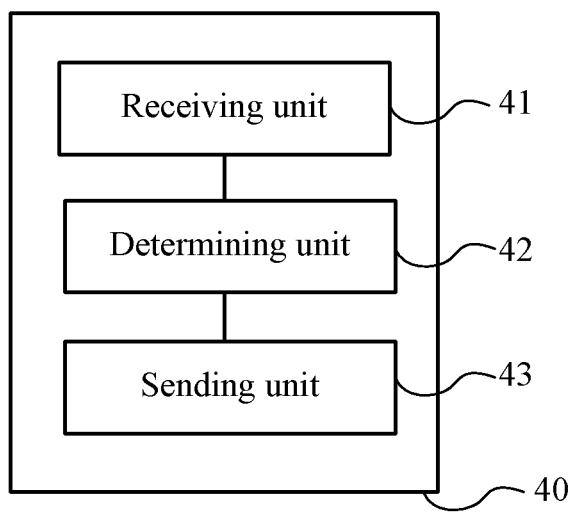
FIG. 4 is a block diagram of user equipment according to an embodiment of the present invention.

FIG. 4 is a block diagram of user equipment according to an embodiment of the present invention. The user equipment 40 in FIG. 4 includes a receiving unit 41, a determining unit 42, and a sending unit 43.

The receiving unit 41 receives a first reference signal set sent by a base station, where the first reference signal set is associated with a user equipment-specific (UE-specific) matrix or matrix set. The determining unit 42 selects a precoding matrix based on the first reference signal set, where the precoding matrix is a function of the user equipment-specific matrix or matrix set. The sending unit 43 sends a precoding matrix indicator PMI to the base station, where the PMI corresponds to the selected precoding matrix.

In this embodiment of the present invention, a first reference signal set is associated with or corresponds to a user equipment-specific matrix or matrix set, a precoding matrix is a function of the user equipment-specific matrix or matrix set, so that the UE can select, based on the user equipment-specific matrix or matrix set, the precoding matrix and feed back a PMI, and a set of the precoding matrix forms a user equipment-specific codebook but not a cell specific codebook or system specific codebook. The cell specific codebook or system specific codebook is a precoding matrix set designed for all users in a cell or a system, while the user equipment-specific codebook is a subset of the cell specific codebook or system specific codebook. Therefore, in this embodiment of the present invention, CSI feedback precision can be improved without excessively increasing feedback overhead, thereby improving system performance.

Optionally, as an embodiment, the receiving unit 41 is further configured to receive the user equipment-specific matrix or matrix set notified by the base station.

Optionally, as another embodiment, the receiving unit is further configured to: before the first reference signal set is received, receive a second reference signal set sent by the base station, where the second reference signal set is associated with a matrix or matrix set; the determining unit is further configured to determine a second index based on the second reference signal set, where the second index is used for indicating an antenna port or antenna port subset selected by the user equipment, or a matrix or matrix set that is associated with the antenna port or antenna port subset selected by the user equipment; and the sending unit is further configured to send the second index to the base station.

Optionally, the first reference signal set is a subset of the second reference signal set.

Optionally, the matrix or matrix set associated with the second reference signal set is cell specific or system specific.

Optionally, as another embodiment, the receiving unit is specifically configured to receive reference signals of the second reference signal set that are sent at different times by the base station. Here, different times may be associated with a same matrix or different matrices separately, or may be associated with a same subset or different subsets of a matrix set separately.

Optionally, as another embodiment, the first reference signal set includes one or more reference signal subsets, and the reference signal subset corresponds to a co-polarized antenna port subset, or corresponds to an antenna port subset that is arranged in a same direction in an antenna port array, or corresponds to an antenna port subset that is located at a quasi-co-location.

Optionally, as another embodiment, the receiving unit is specifically configured to receive reference signals of the first reference signal set that are sent at different times by the base station. Here, different times may be associated with a same matrix or different matrices separately, or may be associated with a same subset or different subsets of a matrix set separately.

Optionally, as another embodiment, the precoding matrix w is a product of two matrices $W_1$ and $W_2$, $W=W_1W_2$, where the matrix $W_1$ is a block diagonal matrix, the block diagonal matrix includes at least one block matrix, and each block matrix is a function of the user equipment-specific matrix or matrix set.

Optionally, the matrix $W_2$ is used to select or perform weighted combination on column vectors in the matrix $W_1$, so as to form the matrix w.

Optionally, as another embodiment, each block matrix X is a Kronecker kronecker product of two matrices C and D, $X=C \otimes D$, and at least one matrix in the two matrices c and D is a function of the user equipment-specific matrix or matrix set.

Optionally, as another embodiment, columns of at least one matrix in the two matrices C and D are rotations of column vectors in a matrix in the user equipment-specific matrix or matrix set, that is, a $k^{th}$ column vector $c_k$ of the matrix C is shown in the expression (2) or (3); or, an $l^{th}$ column vector $d_l$ of the matrix D is shown in the expression (4) or (5), where $N_V$, $N_H$, $N_C$, and $N_D$ are positive integers, $a_m$ is an $m^{th}$ column vector of a matrix A, and the matrix A is a matrix in the user equipment-specific matrix or matrix set.

It should be noted that, that column vectors of the matrix C or matrix D that corresponds to the block matrix X at a different location on a diagonal in $W_1$ satisfy the expressions (2) to (5) does not mean that the block matrix X at a different location on a diagonal in $W_1$ has a same matrix C or matrix D; in contrast, the block matrix X at a different location may have a same or different matrix C or matrix D.

Optionally, as another embodiment, a matrix in the user equipment-specific matrix or matrix set is a matrix formed by columns being DFT vectors, or a matrix formed by column vectors of a Hadamard matrix or a Householder matrix.

Optionally, as another embodiment, the DFT vector $a_l$ is shown in the expression (6), where $N_C \geq N$ or $N_D \geq N$.

Optionally, as another embodiment, the first reference signal set includes at least one reference signal subset, and the reference signal subset is associated with a set of the matrix C or the matrix D.

Optionally, as another embodiment, the reference signal subset has a sending period longer than that of another reference signal.

Figure 5:
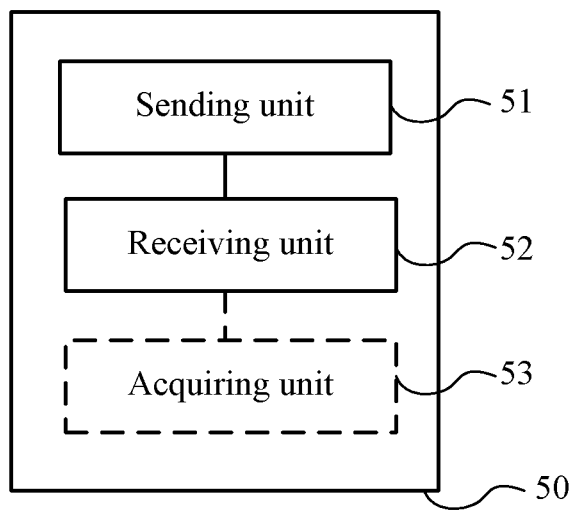
FIG. 5 is a block diagram of a base station according to an embodiment of the present invention.

FIG. 5 is a block diagram of a base station according to an embodiment of the present invention. The base station 50 in FIG. 5 includes a sending unit 51 and a receiving unit 52.

The sending unit 51 is configured to send a first reference signal set to user equipment, where the first reference signal set is associated with a user equipment-specific (UE-specific) matrix or matrix set; and the receiving unit 52 is configured to receive a precoding matrix indicator PMI sent by the user equipment, where the PMI is used for indicating a precoding matrix that is selected based on the first reference signal by the user equipment, and the precoding matrix is a function of the user equipment-specific matrix or matrix set.

In this embodiment of the present invention, a first reference signal set is associated with or corresponds to a user equipment-specific matrix or matrix set, a precoding matrix is a function of the user equipment-specific matrix or matrix set, so that user equipment can select, based on the matrix or matrix set, the precoding matrix and feed back a PMI, and a set of the precoding matrix forms a user equipment-specific codebook but not a cell specific codebook or system specific codebook. The cell specific codebook or system specific codebook is a precoding matrix set designed for all users in a cell or a system, while the user equipment-specific codebook is a subset of the cell specific codebook or system specific codebook. Therefore, in this embodiment of the present invention, CSI feedback precision can be improved without excessively increasing feedback overhead, thereby improving system performance.

Optionally, the base station 50 may further include an acquiring unit 53, configured to obtain the precoding matrix according to the received PMI.

Optionally, as an embodiment, the sending unit 51 is further configured to notify the user equipment of the user equipment-specific matrix or matrix set.

Optionally, as another embodiment, the sending unit 51 is further configured to: before the first reference signal set is sent to the user equipment, send a second reference signal set to the user equipment, where the second reference signal set is associated with a matrix or matrix set; and the receiving unit is further configured to receive a second index that is determined based on the second reference signal set by the user equipment, where the second index is used for indicating an antenna port or antenna port subset selected by the user equipment, or a matrix or matrix set that is associated with the antenna port or antenna port subset selected by the user equipment.

Optionally, the first reference signal set is a subset of the second reference signal set.

Optionally, the matrix or matrix set associated with the second reference signal set is cell specific or system specific.

Optionally, as an embodiment, the acquiring unit 53 is further configured to measure an uplink physical channel or an uplink physical signal, and obtain channel estimation of the user equipment according to channel reciprocity. Based on a predefined criterion, the first reference signal and the user equipment-specific matrix or matrix set are selected for a user. The uplink physical channel may be a physical uplink control channel (Physical Uplink Control Channel, PUCCH for short) or a physical uplink shared channel (Physical Uplink Shared Channel, PUSCH for short); the physical signal may be a sounding reference signal (Sounding Reference Signal, SRS for short) or another uplink demodulation reference signal (DeModulation Reference signal, DMRS for short).

Optionally, as another embodiment, the sending unit is specifically configured to send reference signals of the second reference signal set to the user equipment at different times. Here, different times may be associated with a same matrix or different matrices separately, or may be associated with a same subset or different subsets of a matrix set separately.

Optionally, as another embodiment, the first reference signal set includes one or more reference signal subsets, and the reference signal subset corresponds to a co-polarized antenna port subset, or corresponds to an antenna port subset that is arranged in a same direction in an antenna port array, or corresponds to a quasi-co-location antenna port subset.

Optionally, as another embodiment, the sending unit is specifically configured to send reference signals of the first reference signal set to the user equipment at different times. Here, different times may be associated with a same matrix or different matrices separately, or may be associated with a same subset or different subsets of a matrix set separately.

Optionally, as another embodiment, the precoding matrix w is a product of two matrices $W_1$ and $W_2$, $W=W_1 W_2$, where the matrix $W_1$ is a block diagonal matrix, the block diagonal matrix includes at least one block matrix, and each block matrix is a function of the user equipment-specific matrix or matrix set.

Optionally, the matrix $W_2$ is used to select or perform weighted combination on column vectors in the matrix $W_1$, so as to form the matrix w.

Optionally, as another embodiment, each block matrix X is a kronecker product of two matrices C and D, $X=C \otimes D$, and at least one matrix in the two matrices C and D is a function of the user equipment-specific matrix or matrix set.

Optionally, as another embodiment, columns of at least one matrix in the two matrices C and D are rotations of column vectors in a matrix in the user equipment-specific matrix or matrix set, that is, a $k^{th}$ column vector $c_k$ of the matrix C is shown in the expression (2) or (3); or, an $l^{th}$ column vector $d_l$ of the matrix D is shown in the expression (4) or (5), where $N_V$, $N_H$, $N_C$, and $N_D$ are positive integers, $a_m$ is an $m^{th}$ column vector of a matrix A, and the matrix A is a matrix in the user equipment-specific matrix or matrix set.

It should be noted that, that column vectors of the matrix C or matrix D that corresponds to the block matrix X at a different location on a diagonal in $W_1$ satisfy the expressions (2) to (5) does not mean that the block matrix X at a different location on a diagonal in $W_1$ has a same matrix C or matrix D; in contrast, the block matrix X at a different location may have a same or different matrix C or matrix D.

Optionally, as another embodiment, a matrix in the user equipment-specific matrix or matrix set is a matrix formed by columns being DFT vectors, or a matrix formed by column vectors of a Hadamard matrix or a Householder matrix.

Optionally, as another embodiment, the DFT vector $a_l$ is shown in the expression (6), where $N_C \geq N$ or $N_D \geq N$.

Optionally, as another embodiment, the first reference signal set includes at least one reference signal subset, and the reference signal subset is associated with a set of the matrix C or the matrix D.

Optionally, as another embodiment, the reference signal subset has a sending period longer than that of another reference signal.

Figure 6:
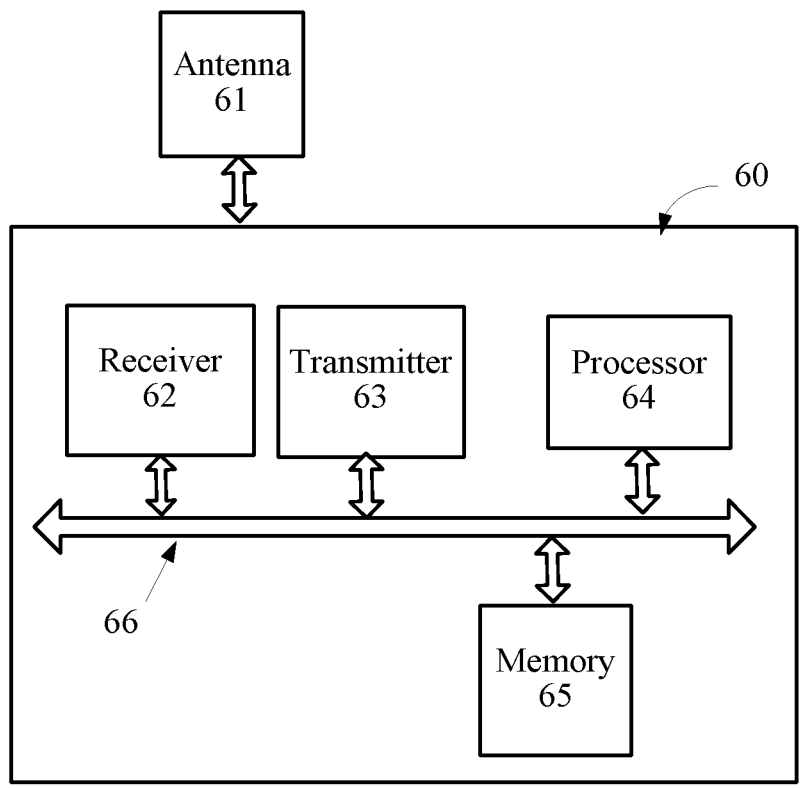
FIG. 6 is a block diagram of user equipment according to another embodiment of the present invention.

FIG. 6 is a block diagram of user equipment according to another embodiment of the present invention. The user equipment 60 in FIG. 6 includes a receiver 62, a transmitter 63, a processor 64, and a memory 65.

The receiver 62 is configured to receive a first reference signal set sent by a base station, where the first reference signal set is associated with a user equipment-specific (UE specific) matrix or matrix set.

The memory 65 stores an instruction that enables the processor 64 to perform the following operation: selecting a precoding matrix based on the first reference signal set, where the precoding matrix is a function of the user equipment-specific matrix or matrix set.

The transmitter 63 is configured to send a precoding matrix indicator PMI to the base station, where the PMI corresponds to the selected precoding matrix.

In this embodiment of the present invention, a first reference signal set is associated with or corresponds to a user equipment-specific matrix or matrix set, a precoding matrix is a function of the user equipment-specific matrix or matrix set, so that the user equipment can select, based on the user equipment-specific matrix or matrix set, the precoding matrix and feed back a PMI, and a set of the precoding matrix forms a user equipment-specific codebook but not a cell specific codebook or system specific codebook. The cell specific codebook or system specific codebook is a precoding matrix set designed for all users in a cell or a system, while the user equipment-specific codebook is a subset of the cell specific codebook or system specific codebook. Therefore, in this embodiment of the present invention, CSI feedback precision can be improved without excessively increasing feedback overhead, thereby improving system performance.

The receiver 62, the transmitter 63, the processor 64, and the memory 65 may be integrated into a processing chip. Alternatively, as shown in FIG. 6, the receiver 62, the transmitter 63, the processor 64, and the memory 65 are connected by using a bus 66.

In addition, the user equipment 60 may further include an antenna 61. The processor 64 may further control an operation of the user equipment 60, and the processor 64 may further be referred to as a CPU (Central Processing Unit, central processing unit). The memory 65 may include a read only memory and a random access memory, and provides an instruction and data to the processor 64. A part of the memory 65 may further include a non-volatile random access memory. Components of the user equipment 60 are coupled together by using a bus system 66. The bus system 66 may include, in addition to a data bus, a power bus, a control bus, a status signal bus, and the like. However, for the purpose of clear description, all buses are marked as the bus system 66 in the figure.

Optionally, as an embodiment, the receiver 62 is further configured to receive the user equipment-specific matrix or matrix set notified by the base station.

Optionally, as another embodiment, the receiver 62 is further configured to: before the first reference signal set is received, receive a second reference signal set sent by the base station, where the second reference signal set is associated with a matrix or matrix set; the memory 65 further stores an instruction that enables the processor 64 to perform the following operation: determining a second index based on the second reference signal set, where the second index is used for indicating an antenna port or antenna port subset selected by the user equipment, or a matrix or matrix set that is associated with the antenna port or antenna port subset selected by the user equipment 60; and the transmitter 63 is further configured to send the second index to the base station.

Optionally, the first reference signal set is a subset of the second reference signal set.

Optionally, as another embodiment, the receiver 62 is specifically configured to receive reference signals of the second reference signal set that are sent at different times by the base station. Here, different times may be associated with a same matrix or different matrices separately, or may be associated with a same subset or different subsets of a matrix set separately.

Optionally, as another embodiment, the first reference signal set includes one or more reference signal subsets, and the reference signal subset corresponds to a co-polarized antenna port subset, or corresponds to an antenna port subset that is arranged in a same direction in an antenna port array, or corresponds to an antenna port subset that is located at a quasi-co-location.

Optionally, as another embodiment, the receiver 62 is specifically configured to receive reference signals of the first reference signal set that are sent at different times by the base station. Here, different times may be associated with a same matrix or different matrices separately, or may be associated with a same subset or different subsets of a matrix set separately.

Optionally, as another embodiment, the precoding matrix w is a product of two matrices $W_1$ and $W_2$, $W=W_1W_2$, where the matrix $W_1$ is a block diagonal matrix, the block diagonal matrix includes at least one block matrix, and each block matrix is a function of the user equipment-specific matrix or matrix set.

Optionally, the matrix $W_2$ is used to select or perform weighted combination on column vectors in the matrix $W_1$, so as to form the matrix W.

Optionally, as another embodiment, each block matrix X is a kronecker product of two matrices C and D, $X=C \otimes D$, and at least one matrix in the two matrices C and D is a function of the user equipment-specific matrix or matrix set.

Optionally, as another embodiment, columns of at least one matrix in the two matrices C and D are rotations of column vectors in a matrix in the user equipment-specific matrix or matrix set, that is, a $k^{th}$ column vector $c_k$ of the matrix C is shown in the expression (2) or (3); or, an $l^{th}$ column vector $d_l$ of the matrix D is shown in the expression (4) or (5), where $N_V$, $N_H$, $N_C$, and $N_D$ are positive integers, $a_m$ is an $m^{th}$ column vector of a matrix A, and the matrix A is a matrix in the user equipment-specific matrix or matrix set.

It should be noted that, that column vectors of the matrix C or matrix D that corresponds to the block matrix X at a different location on a diagonal in $W_1$ satisfy the expressions (2) to (5) does not mean that the block matrix X at a different location on a diagonal in $W_1$ has a same matrix C or matrix D; in contrast, the block matrix X at a different location may have a same or different matrix C or matrix D.

Optionally, as another embodiment, a matrix in a subset of the user equipment-specific matrix or matrix set is a matrix formed by columns being DFT vectors, or a matrix formed by column vectors of a Hadamard matrix or a Householder matrix.

Optionally, as another embodiment, the DFT vector $a_l$ is shown in the expression (6), where $N_C \geq N$ or $N_D \geq N$.

Figure 7:
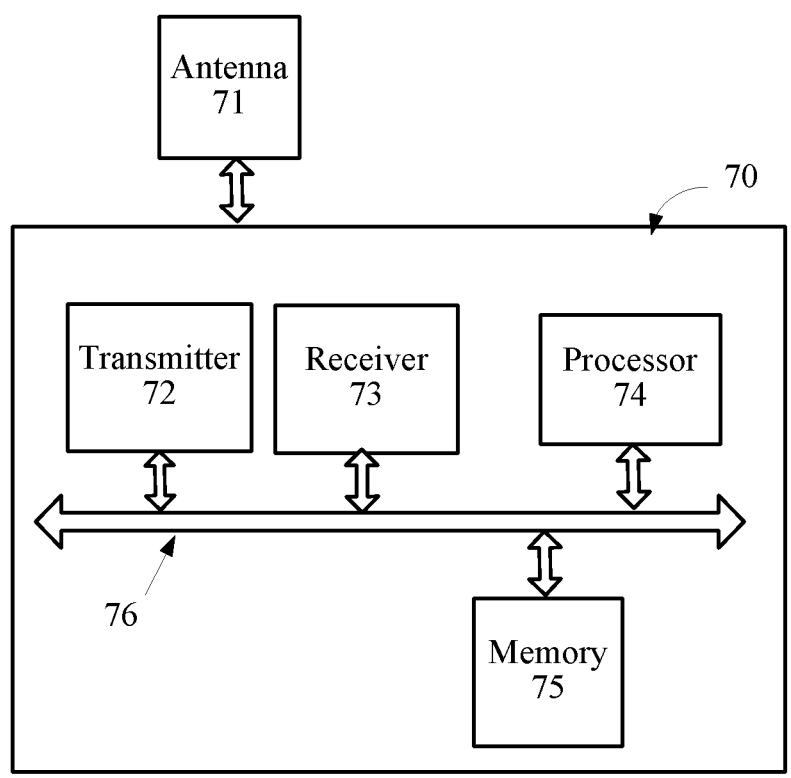
FIG. 7 is a block diagram of a base station according to another embodiment of the present invention.

FIG. 7 is a block diagram of a base station according to another embodiment of the present invention. The base station 70 in FIG. 7 includes a transmitter 72, a receiver 73, a processor 74, and a memory 75.

The transmitter 72 is configured to send a first reference signal set to user equipment, where the first reference signal set is associated with a user equipment-specific (UE specific) matrix or matrix set.

The receiver 73 is configured to receive a precoding matrix indicator PMI sent by the user equipment, where the PMI is used for indicating a precoding matrix that is selected based on the first reference signal by the user equipment, and the precoding matrix is a function of the user equipment-specific matrix or matrix set.

Optionally, the memory 75 may store an instruction that enables the processor 74 to perform the following operation: obtaining the precoding matrix according to the received PMI.

In this embodiment of the present invention, a first reference signal set is associated with or corresponds to a user equipment-specific matrix or matrix set, a precoding matrix is a function of the user equipment-specific matrix or matrix set, so that user equipment can select, based on the user equipment-specific matrix or matrix set, the precoding matrix and feed back a PMI, and a set of the precoding matrix forms a user equipment-specific codebook but not a cell specific codebook or system specific codebook. The cell specific codebook or system specific codebook is a precoding matrix set designed for all users in a cell or a system, while the user equipment-specific codebook is a subset of the cell specific codebook or system specific codebook. Therefore, in this embodiment of the present invention, CSI feedback precision can be improved without excessively increasing feedback overhead, thereby improving system performance.

The transmitter 72, the receiver 73, the processor 74, and the memory 75 may be integrated into a processing chip. Alternatively, as shown in FIG. 6, the transmitter 72, the receiver 73, the processor 74, and the memory 75 are connected by using a bus 76.

In addition, the base station 70 may further include an antenna 71. The processor 74 may further control an operation of the base station 70, and the processor 74 may further be referred to as a CPU (Central Processing Unit, central processing unit). The memory 75 may include a read only memory and a random access memory, and provides an instruction and data to the processor 74. A part of the memory 75 may further include a non-volatile random access memory. Components of the base station 70 are coupled together by using a bus system 76. The bus system 76 may include, in addition to a data bus, a power bus, a control bus, a status signal bus, and the like. However, for the purpose of clear description, all buses are marked as the bus system 76 in the figure.

Optionally, as an embodiment, the transmitter 72 is further configured to notify the user equipment of the user equipment-specific matrix or matrix set.

Optionally, as another embodiment, the transmitter 72 is further configured to: before the first reference signal set is sent to the user equipment, send a second reference signal set to the user equipment, where the second reference signal set is associated with a matrix or matrix set; and the receiver 73 is further configured to receive a second index that is determined based on the second reference signal set by the user equipment, where the second index is used for indicating an antenna port or antenna port subset selected by the user equipment, or a matrix or matrix set that is associated with the antenna port or antenna port subset selected by the user equipment.

Optionally, the first reference signal set is a subset of the second reference signal set.

Optionally, the matrix or matrix set associated with the second reference signal set is cell specific or system specific.

Optionally, as an embodiment, the processor is further configured to measure an uplink physical channel or an uplink physical signal, and obtain channel estimation of the user equipment according to channel reciprocity. Based on a predefined criterion, the first reference signal and the user equipment-specific matrix or matrix set are selected for a user. The uplink physical channel may be a physical uplink control channel (Physical Uplink Control Channel, PUCCH for short) or a physical uplink shared channel (Physical Uplink Shared Channel, PUSCH for short); the physical signal may be a sounding reference signal (Sounding Reference Signal, SRS for short) or another uplink demodulation reference signal (DeModulation Reference signal, DMRS for short).

Optionally, as another embodiment, the transmitter 72 is specifically configured to send reference signals of the second reference signal set to the user equipment at different times. Here, different times may be associated with a same matrix or different matrices separately, or may be associated with a same subset or different subsets of a matrix set separately.

Optionally, as another embodiment, the first reference signal set includes one or more reference signal subsets, and the reference signal subset corresponds to a co-polarized antenna port subset, or corresponds to an antenna port subset that is arranged in a same direction in an antenna port array, or corresponds to a quasi-co-location antenna port subset.

Optionally, as another embodiment, the transmitter 72 is specifically configured to send reference signals of the first reference signal set to the user equipment at different times. Here, different times may be associated with a same matrix or different matrices separately, or may be associated with a same subset or different subsets of a matrix set separately.

Optionally, as another embodiment, the precoding matrix w is a product of two matrices $W_1$ and $W_2$, $W=W_1W_2$, where the matrix $W_1$ is a block diagonal matrix, the block diagonal matrix includes at least one block matrix, and each block matrix is a function of the user equipment-specific matrix or matrix set.

Optionally, the matrix $W_2$ is used to select or perform weighted combination on column vectors in the matrix $W_1$, so as to form the matrix w.

Optionally, as another embodiment, each block matrix X is a kronecker product of two matrices C and D, $X=C\otimes D$, and at least one matrix in the two matrices C and D is a function of the user equipment-specific matrix or matrix set.

Optionally, as another embodiment, columns of at least one matrix in the two matrices C and D are rotations of column vectors in a matrix in the user equipment-specific matrix or matrix set, that is, a $k^{th}$ column vector C of the matrix $c_k$ is shown in the expression (2) or (3); or, an $l^{th}$ column vector $d_l$ of the matrix D is shown in the expression (4) or (5), where $N_V$, $N_H$, $N_C$, and $N_D$ are positive integers, $a_m$ is an $m^{th}$ column vector of a matrix A, and the matrix A is a matrix in the user equipment-specific matrix or matrix set.

It should be noted that, that column vectors of the matrix C or matrix D that corresponds to the block matrix X at a different location on a diagonal in $W_1$ satisfy the expressions (2) to (5) does not mean that the block matrix X at a different location on a diagonal in $W_1$ has a same matrix C or matrix D; in contrast, the block matrix X at a different location may have a same or different matrix C or matrix D.

Optionally, as another embodiment, a matrix in the user equipment-specific matrix or matrix set is a matrix formed by columns being DFT vectors, or a matrix formed by column vectors of a Hadamard matrix or a Householder matrix.

Optionally, as another embodiment, the DFT vector $a_l$ is shown in the expression (6), where $N_C \geq N$ or $N_D \geq N$.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a precoding matrix indicator, performed by a user equipment, comprising:
receiving a first reference signal set sent by a base station, wherein the first reference signal set is associated with a user equipment-specific matrix set, each matrix in the user equipment-specific matrix set comprises at least one column, and each column comprises at least two rows;
selecting a precoding matrix based on the first reference signal set, wherein the precoding matrix W is a product of two matrices $W_1$ and $W_2$, $W=W_1W_2$, the matrix $W_1$ is a block diagonal matrix, the block diagonal matrix comprises two block matrices X, each of the two block matrices X is a kronecker product of two matrices C and D, $X=C \otimes D$, and the matrix C and the matrix D are respectively a function of matrix A and matrix B in the user equipment-specific matrix set, each of the matrix $W_2$, the matrix C and the matrix D comprises at least one column, and each column comprises at least two rows; and
sending a precoding matrix indicator (PMI), to the base station, wherein the PMI corresponds to the selected precoding matrix.

2. The method according to claim 1, wherein
each column in the matrix C is a column in the matrix A; and
each column in the matrix D is a column in the matrix B.

3. The method according to claim 1, wherein the matrix A is a matrix whose columns are discrete Fourier Transformation (DFT) vectors, and the matrix C is not equal to the matrix A, and
wherein the matrix B is a matrix whose columns are DFT vectors, and the matrix D is not equal to the matrix B.

4. The method according to claim 1, wherein the matrix W2 is used for selecting a column vector or weighted combination of column vectors in the matrix $W_1$ to form the matrix W.

5. The method according to claim 1, wherein the user equipment-specific matrix set is notified by the base station.

6. The method according to claim 1, wherein the first reference signal set comprises at least two reference signal subsets, and each of the at least two reference signal subsets corresponds to one of the following:
a subset of co-polarized antenna ports;
a subset of antenna ports that are arranged in a same direction in an antenna port array; and
a subset of antenna ports that are quasi-co-located.

7. The method according to claim 1, wherein the PMI comprises three indexes $i_6$, $i_7$ and $i_8$, wherein the index $i_6$ indicates the matrix C, the index $i_7$ indicates the matrix D, and the index $i_8$ indicates the matrix $W_2$.

8. User equipment, comprising:
a memory comprising instructions; and
a processor in communication with the memory, wherein the processor executes the instructions to
receive a first reference signal set sent by a base station, wherein the first reference signal set is associated with a user equipment-specific matrix set, each matrix in the user equipment-specific matrix set comprises at least one column, and each column comprises at least two rows;
select a precoding matrix based on the first reference signal set, wherein the precoding matrix W is a product of two matrices $W_1$ and $W_2$, $W=W_1W_2$, the matrix $W_1$ is a block diagonal matrix, the block diagonal matrix comprises two block matrices X, each of the two block matrices X is a kronecker product of two matrices C and D, $X=C \otimes D$, and the matrix C and the matrix D are respectively a function of matrix A and matrix B in the user equipment-specific matrix set, each of the matrix $W_2$, the matrix C and the matrix D comprises at least one column, and each column comprises at least two rows; and send a precoding matrix indicator (PMI), to the base station, wherein the PMI corresponds to the selected precoding matrix.

9. The user equipment according to claim 8, wherein each column in the matrix C is a column in the matrix A; and each column in the matrix D is a column in the matrix B.

10. The user equipment according to claim 8, wherein the matrix A is a matrix whose columns are discrete Fourier Transformation (DFT) vectors, and the matrix C is not equal to the matrix A, and wherein the matrix B is a matrix whose columns are DFT vectors, and the matrix D is not equal to the matrix B.

11. The user equipment according to claim 8, wherein the matrix W2 is used for selecting a column vector or weighted combination of column vectors in the matrix $W_1$ to form the matrix W.

12. The user equipment according to claim 8, wherein the user equipment-specific matrix set is notified by the base station.

13. The user equipment according to claim 8, wherein the first reference signal set comprises at least two reference signal subsets, and each of the at least two reference signal subsets corresponds to one of the following:
- a subset of co-polarized antenna ports;
- a subset of antenna ports that are arranged in a same direction in an antenna port array; and
- a subset of antenna ports that are quasi-co-located.

14. The user equipment according to claim 8, wherein the PMI comprises three indexes $i_6$, $i_7$ and $i_8$, wherein the index $i_6$ indicates the matrix C, the index $i_7$ indicates the matrix D, and the index $i_8$ indicates the matrix $W_2$.

15. User equipment, comprising:

a receiver, configured to receive a first reference signal set sent by a base station, wherein the first reference signal set is associated with a user equipment-specific matrix set, each matrix in the user equipment-specific matrix set comprises at least one column, and each column comprises at least two rows;

a processor coupled to the receiver, configured to select a precoding matrix based on the first reference signal set, wherein the precoding matrix W is a product of two matrices $W_1$ and $W_2$, $W=W_1W_2$, the matrix $W_1$ is a block diagonal matrix, the block diagonal matrix comprises two block matrices X, each of the two block matrices X is a kronecker product of two matrices C and D, $X=C\otimes D$, and the matrix C and the matrix D are respectively a function of matrix A and matrix B in the user equipment-specific matrix set, each of the matrix $W_2$, the matrix C and the matrix D comprises at least one column, and each column comprises at least two rows; and a transmitter coupled to the receiver and the processor, configured to send a precoding matrix indicator (PMI), to the base station, wherein the PMI corresponds to the selected precoding matrix.

16. The user equipment according to claim 15, wherein each column in the matrix C is a column in the matrix A; and each column in the matrix D is a column in the matrix B.

17. The user equipment according to claim 15, wherein the matrix A is a matrix whose columns are discrete Fourier Transformation (DFT) vectors, and the matrix C is not equal to the matrix A, and wherein the matrix B is a matrix whose columns are DFT vectors, and the matrix D is not equal to the matrix B.

18. The user equipment according to claim 15, wherein the matrix W2 is used for selecting a column vector or weighted combination of column vectors in the matrix $W_1$ to form the matrix W.

19. The user equipment according to claim 15, wherein the user equipment-specific matrix set is notified by the base station.

20. The user equipment according to claim 15, wherein the first reference signal set comprises at least two reference signal subsets, and each of the at least two reference signal subsets corresponds to one of the following:
- a subset of co-polarized antenna ports;
- a subset of antenna ports that are arranged in a same direction in an antenna port array; and
- a subset of antenna ports that are quasi-co-located.

21. The user equipment according to claim 15, wherein the PMI comprises three indexes $i_6$, $i_7$ and $i_8$, wherein the index $i_6$ indicates the matrix C, the index $i_7$ indicates the matrix D, and the index $i_8$ indicates the matrix $W_2$.

22. A non-transitory computer-readable storage medium storing computer instructions, that when executed by one or more processors, cause the one or more processors to perform the steps of:

receiving a first reference signal set sent by a base station, wherein the first reference signal set is associated with a user equipment-specific matrix set, each matrix in the user equipment-specific matrix set comprises at least one column, and each column comprises at least two rows;

selecting a precoding matrix based on the first reference signal set, wherein the precoding matrix W is a product of two matrices $W_1$ and $W_2$, $W=W_1W_2$, the matrix $W_1$ is a block diagonal matrix, the block diagonal matrix comprises two block matrices X, each of the two block matrices X is a kronecker product of two matrices C and D, $X=C\otimes D$, and the matrix C and the matrix D are respectively a function of matrix A and matrix B in the user equipment-specific matrix set, each of the matrix $W_2$, the matrix C and the matrix D comprises at least one column, and each column comprises at least two rows; and sending a precoding matrix indicator (PMI), to the base station, wherein the PMI corresponds to the selected precoding matrix.

23. The method according to of claim 1, wherein the matrix C is used for quantization of horizontal direction of an antenna system, and the matrix D is used for quantization of vertical direction of an antenna system, or wherein the matrix C is used for quantization of vertical direction of an antenna system, and the matrix D is used for quantization of horizontal direction of an antenna system.

24. The user equipment according to claim 8, wherein the matrix C is used for quantization of horizontal direction of an antenna system, and the matrix D is used for quantization of vertical direction of an antenna system, or wherein the matrix C is used for quantization of vertical direction of an antenna system, and the matrix D is used for quantization of horizontal direction of an antenna system.

25. The user equipment according to claim 15, wherein the matrix C is used for quantization of horizontal direction of an antenna system, and the matrix D is used for quantization of vertical direction of an antenna system, or wherein the matrix C is used for quantization of vertical direction of an antenna system, and the matrix D is used for quantization of horizontal direction of an antenna system.

26. The medium according to claim 22, wherein each column in the matrix C is a column in the matrix A, and each column in the matrix D is a column in the matrix B.

27. The medium according to claim 22, wherein
the matrix A is a matrix whose columns are discrete Fourier Transformation (DFT) vectors, and the matrix C is not equal to the matrix A, and
wherein the matrix B is a matrix whose columns are DFT vectors, and the matrix D is not equal to the matrix B.

28. The medium according to claim 22, wherein the matrix $W_2$ is used for selecting a column vector or weighted combination of column vectors in the matrix $W_1$ to form the matrix W.

29. The medium according to claim 22, wherein the user equipment-specific matrix set is notified by the base station.

30. The medium according to claim 22, wherein the first reference signal set comprises at least two reference signal subsets, and each of the at least two reference signal subsets corresponds to one of the following:
a subset of co-polarized antenna ports;
a subset of antenna ports that are arranged in a same direction in an antenna port array; and
a subset of antenna ports that are quasi-co-located.

31. The medium according to claim 22, wherein the PMI comprises three indexes $i_6$, $i_7$ and $i_8$, and wherein the index $i_6$ indicates the matrix C, the index $i_7$ indicates the matrix D, and the index $i_8$ indicates the matrix $W_2$.

32. The medium according to claim 22, wherein the matrix C is used for quantization of horizontal direction of an antenna system, and the matrix D is used for quantization of vertical direction of an antenna system, or
wherein the matrix C is used for quantization of vertical direction of an antenna system, and the matrix D is used for quantization of horizontal direction of an antenna system.

* * * * *

UNITED STATES PATENT AND TRADEMARK OFFICE
CERTIFICATE OF CORRECTION

PATENT NO. : 10,735,064 B2
APPLICATION NO. : 16/697789
DATED : August 4, 2020
INVENTOR(S) : Wang et al.

It is certified that error appears in the above-identified patent and that said Letters Patent is hereby corrected as shown below:

In the Specification

In Column 1, Line 38, delete "is a" and insert -- s is a --, therefor.

In Column 2, Line 1, delete "AS" and insert -- AAS --, therefor.

In Column 2, Line 4, delete "Anew" and insert -- A new --, therefor.

In Column 3, Line 1, delete "vector c" and insert -- vector $c_k$ --, therefor.

In Column 5, Line 51, delete "D, X=⊗D," and insert -- D, X = C ⊗ D, --, therefor.

In Column 7, Line 18, delete "$c_k=\{1,e^{j2\pi/N_C},\ldots,e^{j2\pi N_V/N_C}\}a_m$," and insert -- $\mathbf{c}_k = diag\{1, e^{j2\pi/N_C}, \cdots, e^{j2\pi N_V/N_C}\}\mathbf{a}_m$, --, therefor.

In Column 7, Line 21-22, delete "$c_k=diag\{1,e^{j2\pi/N_C},\ldots,e^{j2\pi(N_V/2-1)/N_C},e^{j\theta},e^{j\theta}e^{j2\pi(N_V/2-1)/N_C}\}a_m$" and insert -- $\mathbf{c}_k = diag\{1, e^{j2\pi/N_C}, \cdots, e^{j2\pi(N_V/2-1)/N_C}, e^{j\theta}, e^{j\theta}e^{j2\pi/N_C}, \cdots, e^{j\theta}e^{j2\pi(N_V/2-1)/N_C}\}\mathbf{a}_m$ --, therefor.

In Column 8, Line 50-51, delete "$c_k=diag\{1,e^{j2\pi/N_C},\ldots,e^{j2\pi(N_V/2-1)/N_C},e^{j\theta},e^{j\theta}e^{j2\pi/N_C},\ldots,e^{j\theta}e^{j2\pi(N_V/2-1)/N_C}\}a_m$" and insert -- $\mathbf{c}_k = diag\{1, e^{j2\pi/N_C}, \cdots, e^{j2\pi(N_V/2-1)/N_C}, e^{j\theta}, e^{j\theta}e^{j2\pi/N_C}, \cdots, e^{j\theta}e^{j2\pi(N_V/2-1)/N_C}\}\mathbf{a}_m$ --, therefor.

In Column 10, Line 16-17, delete "$d_l=diag\{1,e^{j2\pi/N_D},\ldots,e^{j2\pi(N_H/2-1)/N_D},e^{j\phi},e^{j\phi}e^{j2\pi/N_D},\ldots,e^{j2\pi(N_H/2-1)/N_D}\}a_m$" and insert Signed and Sealed this
Twenty-fifth Day of October, 2022

*Katherine Kelly Vidal*

Katherine Kelly Vidal
*Director of the United States Patent and Trademark Office*

CERTIFICATE OF CORRECTION (continued)
U.S. Pat. No. 10,735,064 B2

In Column 13, Line 44-45, delete "$d_I = \text{diag}\{1, e^{j2\pi/N_D}, \ldots, e^{j2\pi(N_H/2-1)/N_D}, e^{j\phi}, e^{j\phi} e^{j2\pi/N_d}, \ldots, e^{j\phi} e^{j2\pi(N_H/2-1)/N_D}\} a_m,$" and insert -- $d_I = \text{diag}\{1, e^{j2\pi/N_D}, \cdots, e^{j2\pi(N_H/2-1)/N_D}, e^{j\phi}, e^{j\phi} e^{j2\pi/N_D}, \cdots, e^{j\phi} e^{j2\pi(N_H/2-1)/N_D}\} a_m,$ --, therefor.

In Column 15, Line 36, delete "i1=0, ..., 15, i232 0,..., 15," and insert -- i1=0, ...,15, i2=0,...,15, --, therefor.

In Column 18, Line 45, delete "where φ=0,π,2,π,3π/2, . . . ," and insert -- where $\varphi = 0, \pi/2, \pi, 3\pi/2 \ldots$, --, therefor.

In Column 23, Line 9, delete "$a_k \in \{h_0, h_1, \ldots, h_{N_b-1}\}, k=0, \ldots, N_a-1,$" and insert -- $\mathbf{a}_k \in \{\mathbf{h}_0, \mathbf{h}_1, \ldots, \mathbf{h}_{N_h-1}\}, k = 0, \ldots, N_a-1$ --, therefor.

In Column 23, Line 35, delete "$b_k \in \{h'_0, h'_1, \ldots, h'_{N'_b-1}\}, k=0, \ldots, N_b-1,$" and insert -- $\mathbf{a}_k \in \{\mathbf{h}_0, \mathbf{h}_1, \ldots, \mathbf{h}_{N_h-1}\}, k = 0, \ldots, N_a-1$ --, therefor.